(12) United States Patent
Iino et al.

(10) Patent No.: US 6,765,334 B1
(45) Date of Patent: Jul. 20, 2004

(54) LINEAR OR PIVOTAL MOTION MECHANISM USING ULTRASONIC MOTOR AND ELECTRONIC DEVICE EQUIPPED WITH LINEAR OR PIVOTAL MOTION MECHANISM

(75) Inventors: Akihiro Iino, Chiba (JP); Masao Kasuga, Chiba (JP); Makoto Suzuki, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/663,878

(22) Filed: Sep. 15, 2000

(30) Foreign Application Priority Data

Sep. 21, 1999 (JP) .......................................... 11-266508
Sep. 22, 1999 (JP) .......................................... 11-269325
Aug. 11, 2000 (JP) ...................................... 2000-244330

(51) Int. Cl.[7] .............................................. H01L 41/06
(52) U.S. Cl. ........................... 310/323.02; 310/323.03; 310/316.01
(58) Field of Search ..................... 310/323.02, 323.3, 310/328, 316.01, 316.03, 317

(56) References Cited

U.S. PATENT DOCUMENTS

| 4,893,047 A | * | 1/1990 | Honda .................... 310/323.02 |
|---|---|---|---|
| 4,935,659 A | * | 6/1990 | Naka et al. ................. 310/328 |
| 4,945,275 A | * | 7/1990 | Honda .................... 310/323.02 |
| 5,041,132 A | * | 8/1991 | Miyata .................. 310/323.03 |
| 5,043,956 A | * | 8/1991 | Tsukada et al. ......... 310/323.02 |
| 5,053,670 A | * | 10/1991 | Kosugi .................. 310/313.03 |
| 5,103,128 A | * | 4/1992 | Adachi .................. 310/323.03 |
| 5,198,935 A | * | 3/1993 | Imanari et al. ............. 310/317 |
| 5,210,651 A | * | 5/1993 | Shibuta et al. ......... 310/323.03 |
| 5,332,941 A | * | 7/1994 | Honda .................... 310/323.02 |
| 5,640,063 A | * | 6/1997 | Zumeris et al. ......... 310/323.02 |
| 5,761,782 A | * | 6/1998 | Sager .......................... 310/328 |
| 5,783,899 A | * | 7/1998 | Okazaki ................. 310/316.01 |

* cited by examiner

Primary Examiner—Mark Budd
(74) Attorney, Agent, or Firm—Adams & Wilks

(57) ABSTRACT

A linear motion mechanism comprises a supersonic motor having a rotor which is rotationally driven by vibration of a vibrating body having a piezoelectric element. A transmission mechanism is disposed on the rotor for rotation therewith. A moving body undergoes linear movement in a direction crosswise to a longitudinal axis of a rotational shaft of the rotor in accordance with rotation of the transmission mechanism. A pressurizing mechanism presses the moving body into pressure contact with the transmission mechanism.

7 Claims, 20 Drawing Sheets

LINEAR OR PIVOTAL MOTION MECHANISM USING ULTRASONIC MOTOR AND ELECTRONIC DEVICE EQUIPPED WITH LINEAR OR PIVOTAL MOTION MECHANISM

BACKGROUND OF THE INVENTION

1. Field of the Invention

The present invention relates to electronic equipment using a supersonic motor and a supersonic motor for frictionally driving a moving body by a vibrating body having a piezoelectric element, and more particularly to a micromechanism for linearly moving a moving body by using a rotary type supersonic motor.

2. Description of the Prior Art

Recently, a field for which the linear movement is required has been expanded in various electronic equipment, optical equipment, medical equipment or the like. In general, in such a case, for instance, an electromagnetic type motor and a feed screw are used in combination, a voice coil motor or a movable coil motor is used, or an actuator using piezoelectric element is used.

However, in the case where the electromagnetic motor and the feed screw are used in combination, the mechanism becomes complicated and large in size and at the same time it is impossible to control a fine feed amount due to a backlash in the feed mechanism. Also, in the case where the voice motor or the movable coil motor is used, it is very difficult to perform the fine positioning operation, and also in some cases the rigidity is low and the position is displaced due to the outside vibration. In particular, in many cases, the voice coil motor or the movable coil motor is used in combination with a leaf spring or the like, and in those cases, the rigidity is further degraded. Then, the actuator using the electromagnetic force is affected by adverse effect of the electromagnetic noise. Also, at the same time, since the electromagnetic noise is generated, adverse affect is applied to a recording medium such as a magnetic disc and there is a possibility that adverse affect would be applied to wave used in communication.

In the case where the actuator using the piezoelectric element is used, although it is possible to perform a fine control, the shift is fine but a rough movement is impossible. If the enlargement mechanism is provided, the mechanism becomes complicated and large in size.

Then, in the case of the above-described motor or actuator, the electric power is consumed even if the mechanism is stopped at a particular position.

Therefore, an object of the present invention is to provide a downsized linear motion mechanism that may perform a fine movement and a rough movement by using a rotary type supersonic motor.

SUMMARY OF THE INVENTION

According to the present invention, it is possible to realize a linear or swing motion mechanism with a supersonic motor for linearly moving or swinging and moving a moving body by a rotary type supersonic motor and an output transmission means such as a cam or a pinion rotating in cooperation with a rotor of the supersonic motor.

According to the present invention, a linear motion mechanism with a supersonic motor or a swing motion mechanism with a supersonic motor can be realized by comprising a supersonic motor for driving a rotor by vibration of a vibrating body having a piezoelectric element, a pinion cooperating with the movement of the rotor, a moving body having a rack operating in a constant direction in response to a rotation of the pinion, and a pressurizing mechanism provided in the moving body for imparting a contact pressure to the pinion and the rack of the moving body.

Next, the linear motion mechanism with a supersonic motor according to the present invention is characterized by the cam or the pinion and the rotor being provided integrally with each other. Thus, a greater drive force is obtained from the supersonic motor, and it is possible to realize the linear motion mechanism with the supersonic motor in small size and thin shape.

Further, in the above linear motion mechanism with a supersonic motor according to the present invention, an outer diameter of the cam or the pinion is smaller than an outer diameter of an output pickup portion of the vibrating body. Thus, the moving body may obtain a larger drive force.

According to the present invention, a swing motion mechanism with a supersonic motor can be realized by comprising a supersonic motor for driving a rotor by vibration of a vibrating body having a piezoelectric element, a cam cooperating with the movement of the rotor, a moving body operating in a swing motion in response to a rotation of the cam, and a pressurizing mechanism provided in a part of the moving body for imparting a contact pressure to the cam and the moving body.

A linear motion mechanism with a supersonic motor according to the present invention is characterized by comprising a supersonic motor for driving a rotor by vibration of a vibrating body having a piezoelectric element, a cam or a pinion cooperating with the movement of the rotor, a moving body operating in a constant direction in response to a rotation of the cam or the pinion, and a pressurizing mechanism provided on an extension line of a guide portion that guides the movement of the moving body, for imparting a contact pressure to the cam or the pinion and to the moving body. Thus, since the guide of the moving member and the pressurization on the moving member occur coaxially, the movement of the moving member does not slant but is smooth, thereby making the invention strong against the external turbulence such as vibration.

A linear motion mechanism with a supersonic motor according to the present invention is characterized by comprising a supersonic motor for driving a rotor by vibration of a vibrating body having a piezoelectric element, a cam cooperating with the movement of the rotor, a moving body operating in a constant direction in response to a rotation of the cam, a point of application of force by the cam on a straight line connecting two guide portions guiding the movement of the moving body or two support portions supporting the moving body, and a point of application of force by a pressurizing mechanism for imparting a contact pressure to the cam and the moving body, the point being present on the above straight line. Thus, the point of application of force by the cam and a point of application of force by the pressurizing mechanism are provided on the same straight line, and therefore the movement of the moving member does not slant but is smooth, thereby making the invention strong against the external turbulence such as vibration.

A linear motion mechanism with a supersonic motor according to the present invention is comprised by a supersonic motor for driving a rotor by vibration of a vibrating body having a piezoelectric element, a cam cooperating with the movement of the rotor, a moving body operating in a constant direction in response to a rotation of the cam, and a point of application of force by the cam in the gravitational center of the moving body. Thus, since the point of application of force by the cam acts concentrically on the gravitational center of the moving body, the movement of the moving member does not slant but is smooth, thereby making the invention strong against the external turbulence such as vibration.

The linear motion mechanism with a supersonic motor according to the present invention is characterized in that a guide member for guiding the movement of the moving body is provided in a part of a rotor pressurizing member for imparting a contact pressure to the rotor and the moving body. Thus, it is possible to realize the linear motion mechanism in small size and thin shape The linear motion mechanism with a supersonic motor or the swing motion mechanism with a supersonic motor according to the present invention is characterized in that when the supersonic motor is to be started, the rotor is rotated in advance in a direction so that the pressurizing force of the pressurizing mechanism gives a rotational force to the rotor, or a stationary wave is generated by the vibrating body so that a predetermined operation is performed by the rotor after the rotor has previously been rotated by the pressurizing force of the pressurizing mechanism. Thus, the linear motion mechanism with a supersonic motor, or the swing motion mechanism with a supersonic motor, of supreme reliability can be realized by avoiding the start failure due to the stick and the partial abrasion between the rotor and the vibrating body which occur in the case where the motor is left for a long period of time.

According to the present invention, the linear motion mechanism with a supersonic motor can be realized by comprising a fixing and supporting member, a stator for generating elastic vibration in a vibrating body having a piezoelectric element, a rotor translated into the rotational motion through a frictional force by the elastic vibration of the stator, a first pressurizing mechanism for imparting a suitable pressurizing force to the stator and the rotor, a rotation-linear motion converting mechanism for converting the rotational motion of the rotor into the linear motion, and a moving body portion linearly moved in accordance with the rotational motion of the rotor.

The linear motion mechanism with a supersonic motor according to the present invention can be realized by the rotation-linear motion converting mechanism comprising a guide member fixed to the fixing and supporting member, a rotating body portion rotated together with the rotor and having a slant portion different in thickness in a circumferential direction of the rotor, a linearly, moving body portion having a projecting portion at least a part of which is brought into contact with the slant portion of the rotating body portion, the linearly moving body portion being linearly moved in the thickness direction of the rotor with the guide member as a guide in accordance with the rotational motion of the rotor, and a second pressurizing mechanism disposed such that the moving body and the linearly moving body portion come into pressing contact with the rotating body portion at a suitable pressure.

The linear motion mechanism with a supersonic motor according to the present invention is characterized in that a pressurizing force in the second pressurizing mechanism is smaller than the pressurizing force in the first pressuring mechanism. Thus, the drive force of the supersonic motor is not affected by any adverse effect due to the external turbulence such as a load of the moving member, and therefore it is possible to realize the linear motion mechanism with the supersonic motor that is stable even in small size and thin shape and can obtain the drive force.

The linear motion mechanism with a supersonic motor according to the present invention is characterized in that the first pressurizing mechanism for applying a suitable pressurizing force to the stator and the rotor and the second pressurizing mechanism disposed such that the linearly moving body portion comes into pressing contact with the rotating body portion at a suitable pressure are used in common. Thus, it is possible to realize the linear motion mechanism with the supersonic motor in even smaller size and thinner shape.

The linear motion mechanism with a supersonic motor according to the present invention is characterized in that the rotating body portion has a projecting portion that enables the rotating body portion to come into contact with the linearly moving body portion at three points. Thus, the point of application of force of the linearly moving body portion that operates together with the moving body portion acts stably and uniformly on the rotating body portion. Therefore the portion operates smoothly, making the invention strong against the external turbulence such as vibration.

According to the present invention, the above linear motion mechanism with a supersonic motor is used in electronic equipment, which is characterized in that a load member is driven by the moving body. Thus it is possible to realize electronic equipment that is strong against the external turbulence such as vibration and free from the effect of the magnetic noise in a compact shape with low power consumption.

According to the present invention, the linear motion mechanism with a supersonic motor is used in electronic equipment, which is characterized in that an optical intensity is varied by the moving member. Thus it is possible to realize electronic equipment that is strong against the external turbulence such as vibration and free from the effect of the magnetic noise in a compact shape with low power consumption.

According to the present invention, the linear motion mechanism with a supersonic motor is used in electronic, which is characterized in that an optical distance is varied by the moving member. Thus it is possible to realize electronic equipment that is strong against the external turbulence such as vibration and free from the effect of the magnetic noise in a compact shape with low power consumption.

BRIEF DESCRIPTION OF THE DRAWINGS

A preferred form of the present invention is illustrated in the accompanying drawings in which.

DETAILED DESCRIPTION OF THE PREFERRED EMBODIMENTS

Embodiments in which the present invention is applied will now be described in detail with reference to FIGS. 1 to 20.

Embodiment 1

First, an example of a supersonic motor applicable to the present invention is described.

Figure 1:
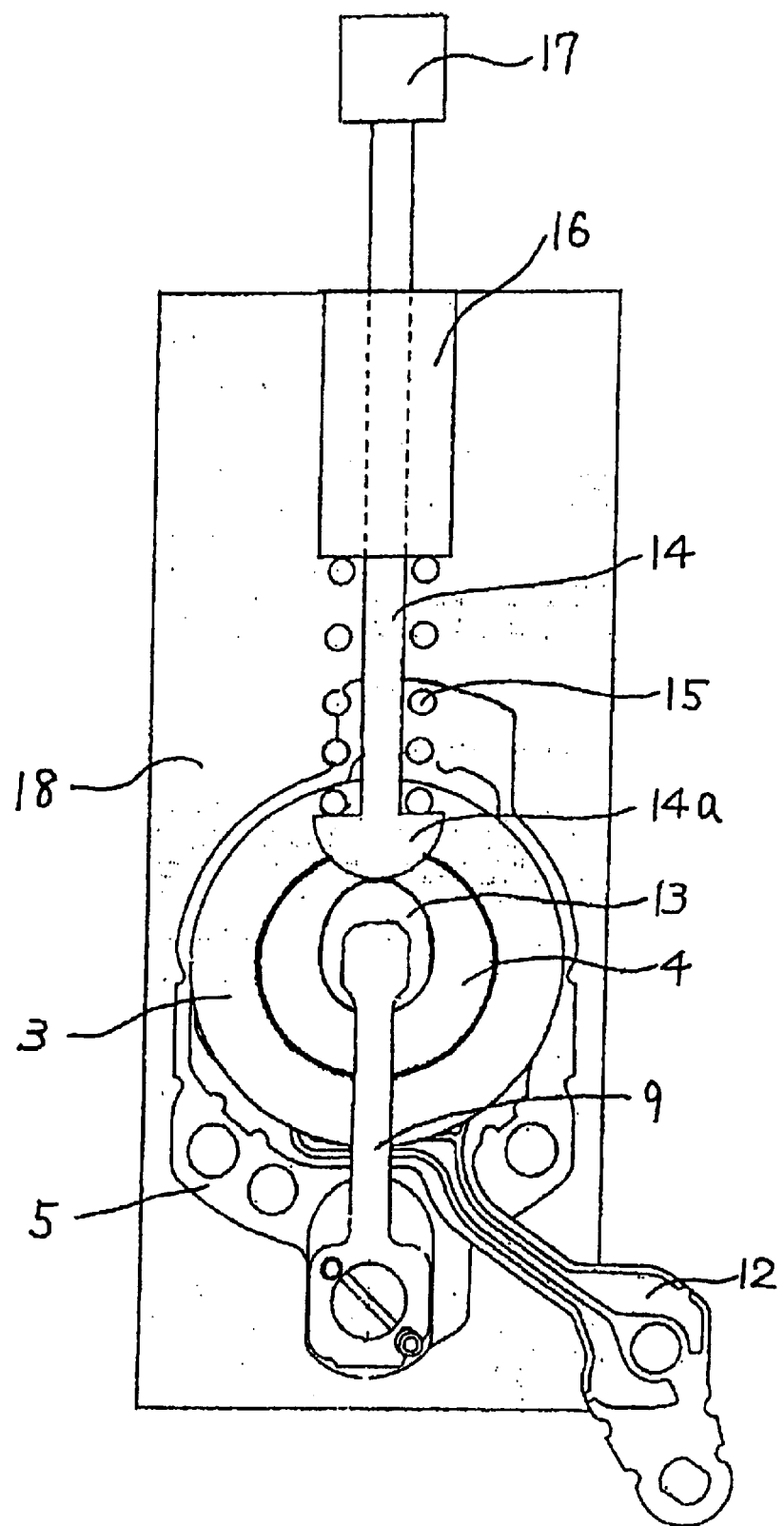
FIG. 1 shows a first example of a linear motion mechanism using a supersonic motor according to the present invention.
Figure 2:
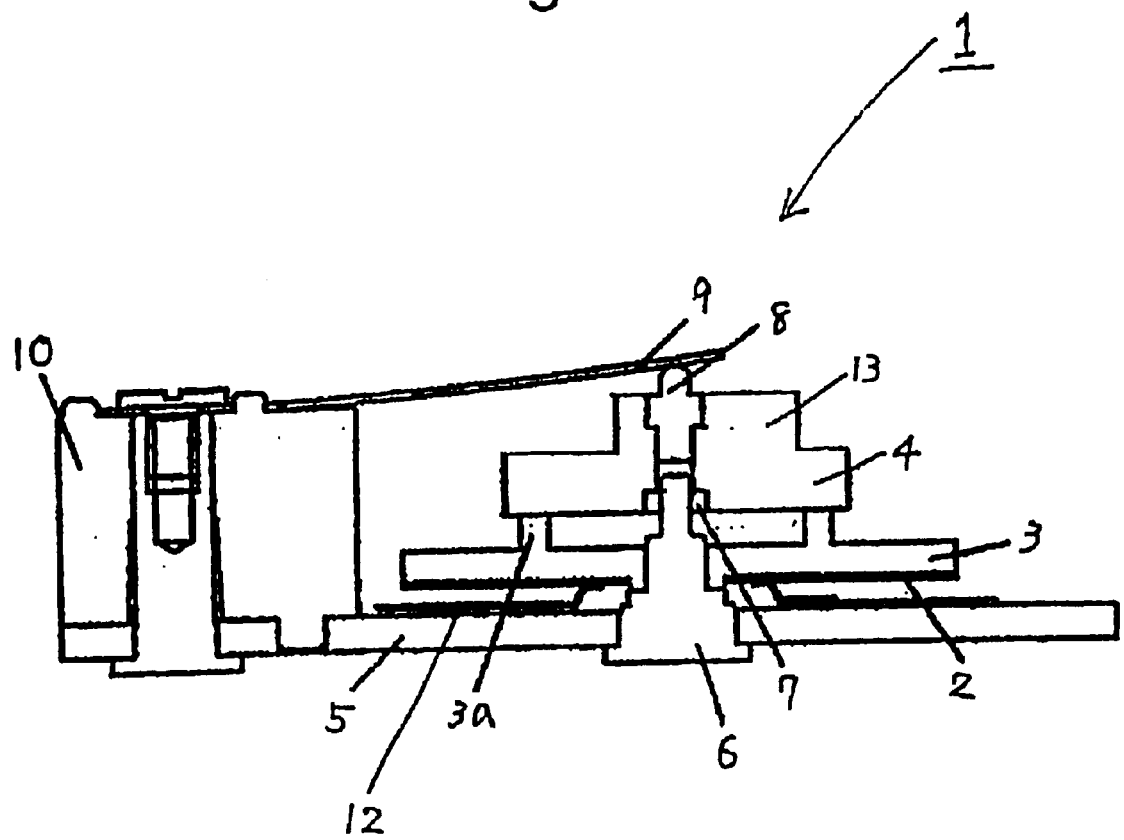
FIG. 2 shows a cross-sectional view showing a structure of the supersonic motor according to the present invention.

FIGS. 1–2 show a structure of a supersonic motor 1 to which the present invention may be applied, and FIGS. 3A–3E show an operational principle of the supersonic motor 1. The operational theory of the supersonic motor according to the present invention will first be described. In FIG. 2, a disc-like vibrating body 3 is supported to a center shaft 6 fixed at its center to a support plate 5. A piezoelectric element 2 is bonded to a first surface of the vibrating body 3, and projections 3a for enlarging a vibratory shift of the vibrating body 3 and imparting a rotational force to a rotor 4 are provided on a second surface. A bearing 7 is provided at the center of the rotor 4 and the center thereof is guided by the center shaft 6. A pivot 8 provided on a central portion of the rotor and having a tip end curved is pressurized by a spring member 9 having one end fixed to a spring seat 10 to thereby impart a contact pressure between the projections 3a of the vibrating body 3 and the rotor 4. A vibrating wave excited to the vibrating body 3 is converted into the rotational force of the rotor 4 through the frictional force by the piezoelectric effect of the piezoelectric element 2.

Figure 3C:
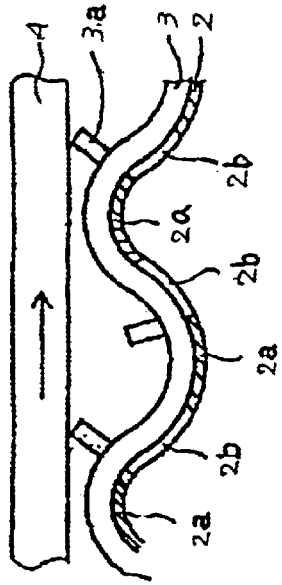
FIGS. 3A–3E show a drive principle of the supersonic motor according to the present invention.
Figure 3D:
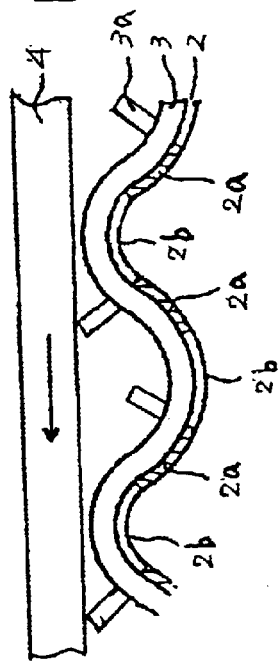
Figure 3E:
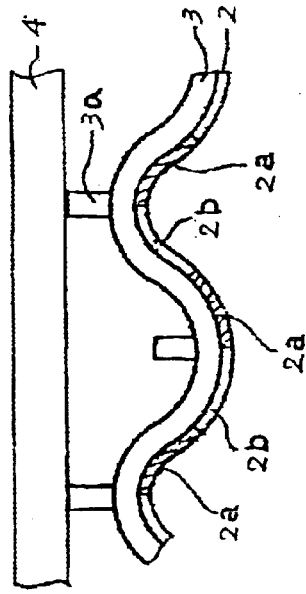
Figure 3A:
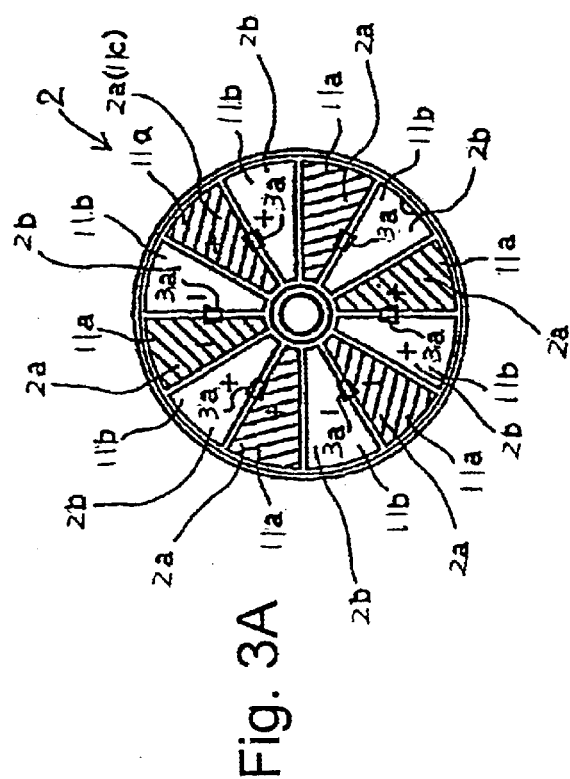
Figure 3B:
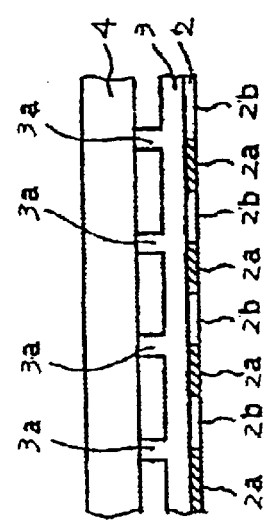

FIGS. 3A–3E show the operational principle in detail. The piezoelectric element 2 bonded to the vibrating body 3 is divided by every one-fourth wavelength in the circumferential direction and polarized in a thickness direction so that every other piece has a reversed direction. Every other electrode pattern is electrically short-circuited to constitute two electrode pattern groups of hatched portions 11a and non-hatched portions 11b. The vibrating body 3 and the piezoelectric element 2 are bonded so that the projections 3a of the vibrating body 3 are located just at border lines between the electrode patterns of the hatched portion 11a and non-hatched portion 11b. Electrodes 111c are provided over the entire contact surface between the piezoelectric element 2 and the vibrating body 3. (FIGS. 3A–3B)

When a drive signal having a predetermined frequency is applied to the pattern group 11a of the hatched portion, a stationary wave as shown in FIG. 3C is generated in the vibrating body 3. At this time, since the projections 3a that have been raised are slanted rightward, the rotor 4 that comes into contact with these projections is moved rightward.

On the other hand, when a drive signal is applied to the pattern group 11b of the non-hatched portion, a stationary wave as shown in FIG. 3D is generated in the vibrating body 3. In this case, the rotor 4 is moved leftward. Thus, one of the surfaces of the piezoelectric element is used as a common electrode 11c, the two electrode groups 11a and 11b are provided on the other surface, and the electrode group to which the drive signal is applied is selected out of the two electrode groups 11a and 11b whereby the position where the stationary wave is generated in the vibrating body is shifted and the moving direction of the rotor 4 that comes into contact with the vibrating body 3 may be controlled.

The drive signal is applied in between a flexible substrate 12 electrically connected to the electrode pattern groups 11a and 11b of the piezoelectric element 2 and the support plate 5. The support plate 5 is electrically connected to the electrode 11c through the vibrating body 3 and the center shaft 6.

If the piezoelectric element 2 according to this embodiment is used, it is possible to excite the stationary wave having three wave frequencies in the circumferential direction of the vibrating body 3. Also, since the number of nodes in the radial direction are different in accordance with the frequency, it is preferable that the projections 3a be provided on the amplitude maximum portion to the radial direction of the vibratory mode to be excited.

The first embodiment will now be described. The support plate 5 of the supersonic motor 1 is connected to a second support plate 18. In the rotor 4, a cam 13 is provided integrally with the rotor 4. The moving body 14 is movable in one direction in accordance with a guide surface of a guide 16 mounted on the second support plate 18 and at the same time a curved tip end 14a of the moving body 14 comes into contact with a cam 13. A prepressure spring 15 is received between the guide 16 and the tip end 14a of the moving body 14 to impart a contact pressure to the tip end 14a of the moving body 14 and the cam 13. When the rotor 4 rotates, the cam 13 also rotates together. The moving body 14 moves in response to the change in radial length of the cam 13. In this case, since the prepressure is applied between the tip end 14a of the moving body 14 and the cam 13, there is no rattle among the cam 13, the rotor 4 and the moving body 14. It is also possible to perform a stable operation against the vibration from the outside or the posture difference. Furthermore, according to the feature of the supersonic motor, the frictional force works between the rotor 4 and the projections 3a of the vibrating body 3 without consuming the electric power when stopped, while maintaining the movement of the moving body 14. Accordingly, effecting the feature of the supersonic motor that may perform high precision positioning operation, it is possible to perform the positioning operation with high precision also for the linear movement of the moving body 14. Also, the response characteristics is ensured in comparison with an electromagnetic motor or an actuator. The contour of the cam 13 is made smaller than a diameter of the projections 3a for transmitting the force of the vibrating body so that the large force may be transmitted to the moving body 14.

Figure 4:
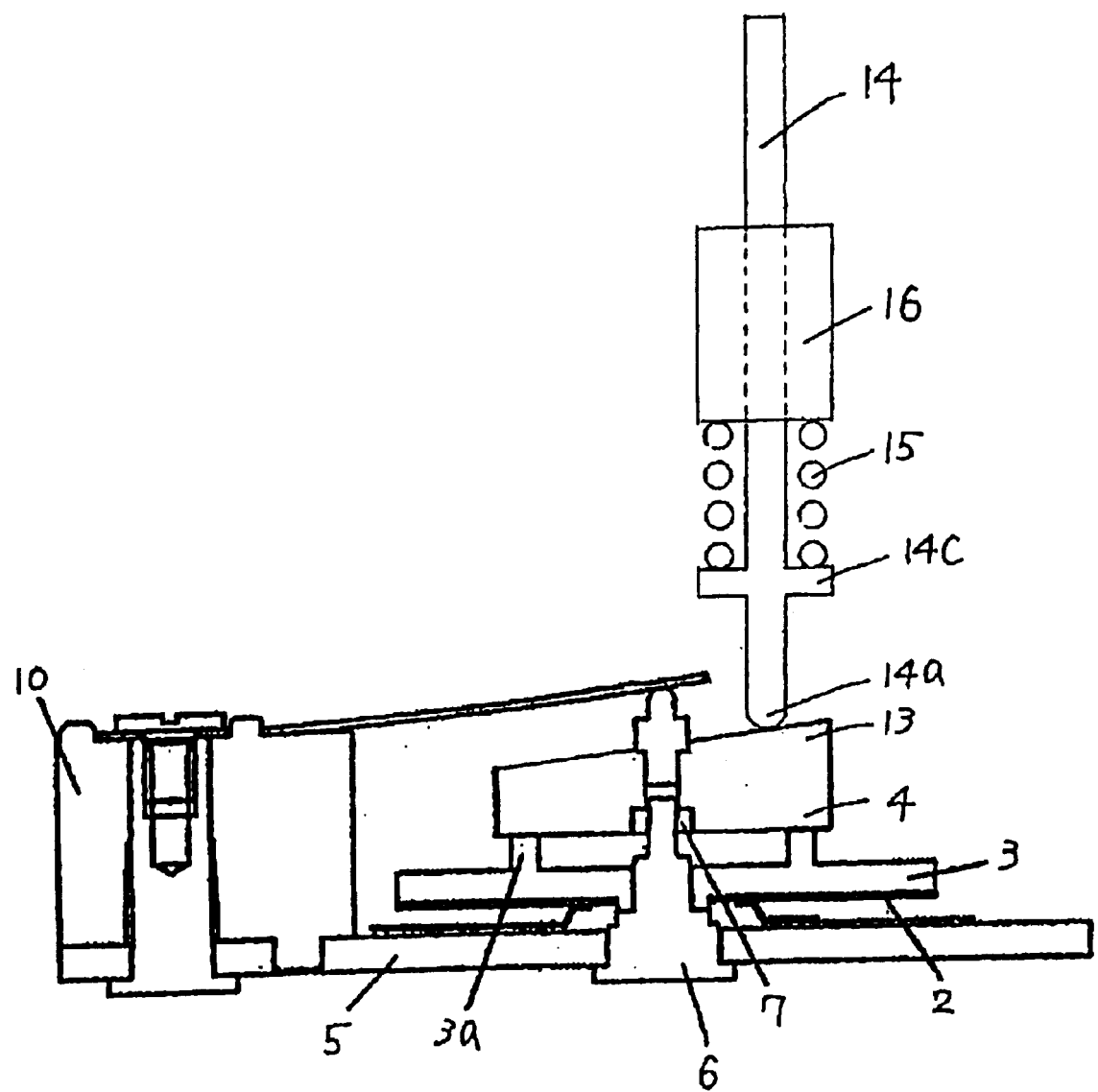
FIG. 4 shows a modification example 1 of the first example of the linear motion mechanism using the supersonic motor according to the present invention.

FIG. 4 shows a modification example 1 of this embodiment. The direction of the supersonic motor 1 is rotated through 90 degrees so that the tip end 14a of the moving body 14 is brought into contact with a top surface of the motor 4. A cam portion 13 having a different thickness is provided in the rotor 4, and the moving body 14 in contact with the rotor 4 is operated according to the rotation of the rotor 4.

Figure 5:
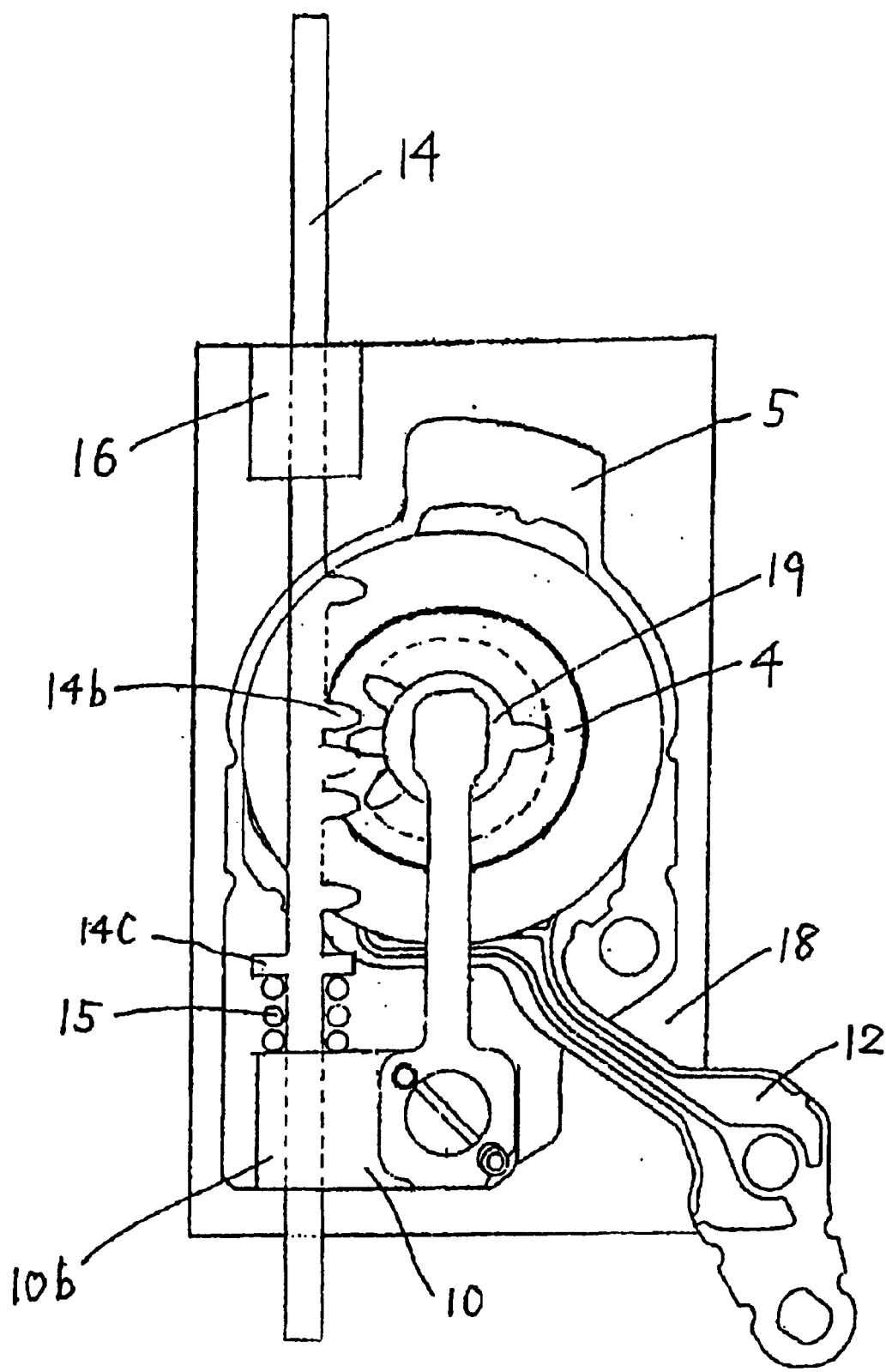
FIG. 5 shows a modification example 2 of the first example of the linear motion mechanism using the supersonic motor according to the present invention.

FIG. 5 shows a modification example 2 of this embodiment. In this case, a pinion 19 is provided on the rotor 4 and engages with a rack 14b provided on the moving body 14 to thereby operate the moving body in accordance with the movement of the rotor 4. The moving body 14 is guided so as to move in one direction to the guide 16 and a second guide 10b provided in a spring seat 10. The second guide 10b is provided in the spring seat to thereby realize the miniaturization and simplification of the machine according to this embodiment. The backlash between the rack 14b and the pinion 19 is moderated by the prepressure spring 15 provided between the second guide 10b and the stepped portion 14c provided at a part of the moving body 14.

Figure 6:
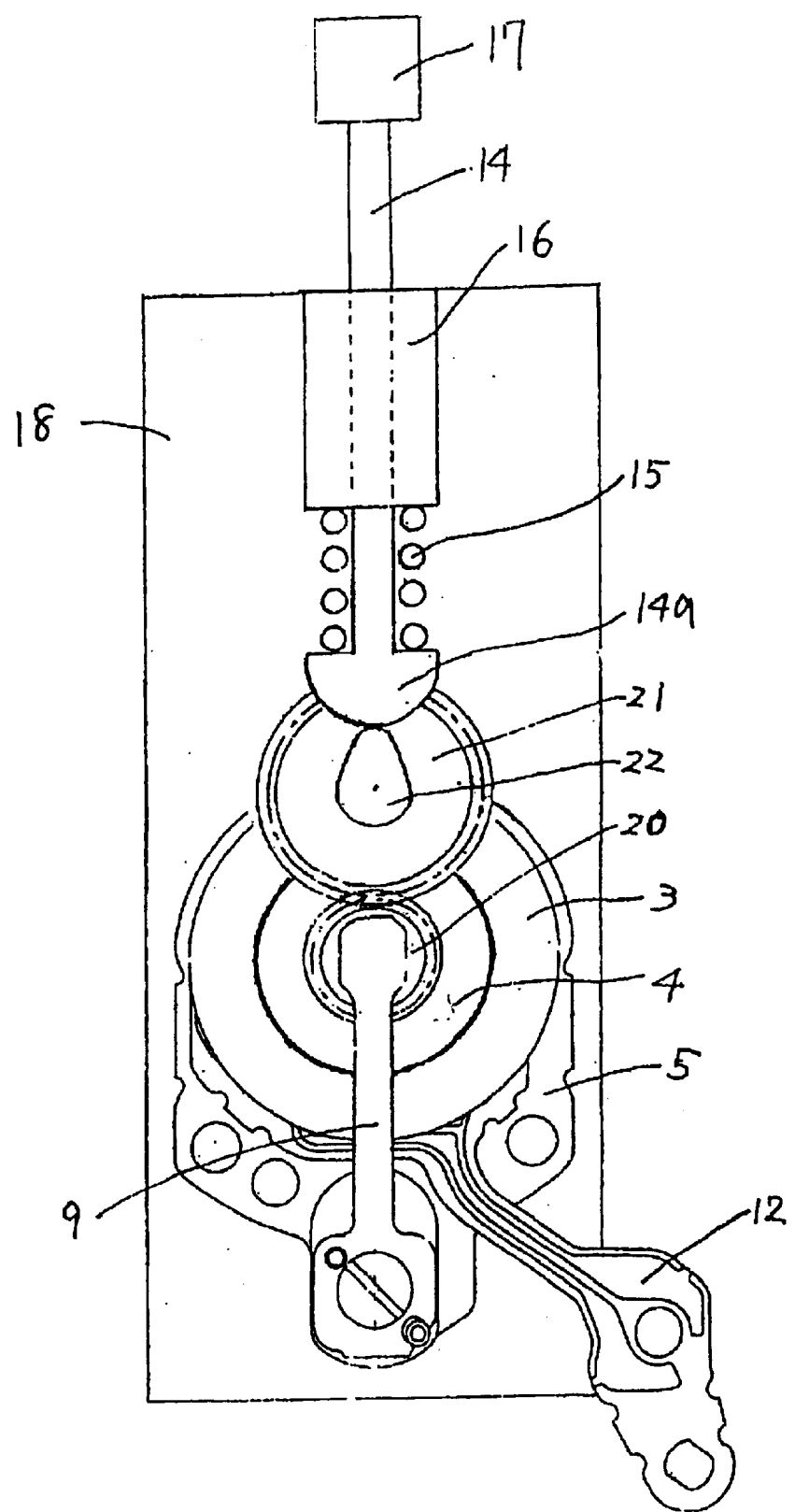
FIG. 6 shows a modification example 3 of the first example of the linear motion mechanism using the supersonic motor according to the present invention.

FIG. 6 shows a modification example 3 of this embodiment. In this case, a gear 20 is provided on the rotor 4 to rotate a cam 22 provided on a gear 21. The moving body 14 operates in accordance with the movement of the cam 22. The gear 21 and the gear 20 operate so as to decelerate the rotation of the rotor 4, and transmit a large force to the moving body 14. Also, the backlash between the gears 20 and 21 is moderated by the prepressure spring 15 so that the moving body 14 may be positioned and operated with precision.

For instance, if a magnetic head 17 is mounted at the tip end of the moving body 14, it is possible to realize a hard disc with high density. Furthermore, since the supersonic motor does not generate any magnetic field, there is no adverse affect against the magnetic head 17 or a magnetic disc (not shown). Also, if a stage is provided instead of the magnetic head 17, it is possible to realize a downsized finely moving stage. In this case, it is possible to perform the fine movement and the rough movement. Also, if a lens is mounted at the tip end of the moving body 14 and a CCD camera is provided in a position in parallel with the extension in the moving direction of the moving body 14, it is possible to realize a zooming mechanism or an auto-focus mechanism for a camera of a catheter used in a medical field. It is possible to perform an operation by a remote operation if a blade tool is provided instead of the lens.

By the way, it is possible to point out as one of the defects of the supersonic motor a fact that stick would occur in the contact surface between the rotor 4 and the vibrating body 3 and the operation failure would occur in the case where the motor is left for a long period of time without any operation. Although the defect depends upon the material of the contact surface or the effect of the outside circumstances (temperature, humidity or the like), for example, it is possible to avoid operation failure due to stick by utilizing the rotational force in the case where the pressurizing mechanism (prepressure spring 15) is provided for always imparting the rotational force in the constant direction to the rotor 4 as shown in the present invention.

For instance, in the case where the supersonic motor 1 is to be driven, the rotor 4 is rotated in a direction so that the force of the prepressure spring 15 imparts the rotational force to the rotor 4 in advance. Alternatively, the stationary wave as shown in FIG. 3E is generated and the frictional force is reduced between the rotor 4 and the vibrating body 3 without imparting any rotational force to the rotor 4, whereby the rotor 4 is operated only by the rotational force due to the prepressure of the prepressure spring 15. After the stick condition is released by such a method, a predetermined operation is performed. Incidentally, in order to excite the stationary wave shown in FIG. 3E, it is sufficient to apply the drive signal to both electrode patterns of the hatched portion 11a and the non-hatched portion 11b.

Second Embodiment

Figure 7A:
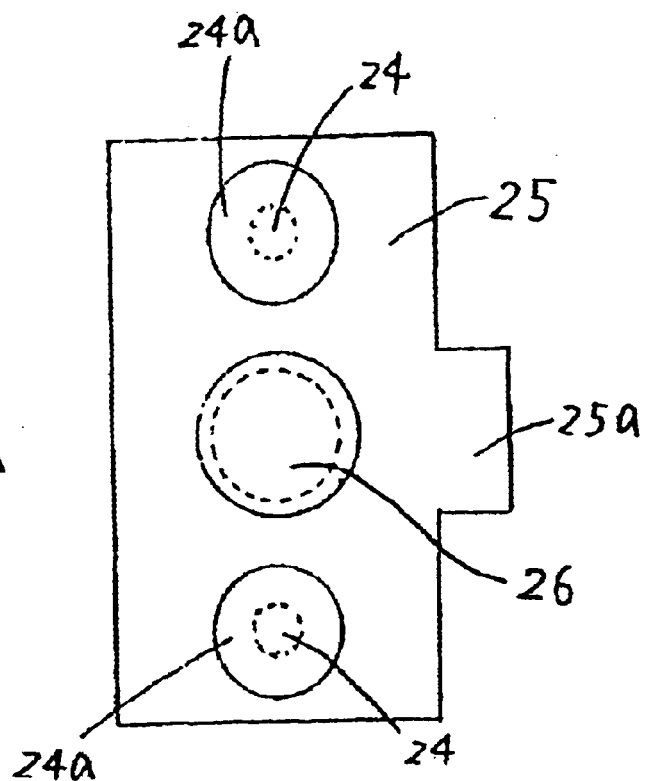
FIGS. 7A–7B show a second example of a linear motion mechanism using a supersonic motor according to the present invention.
Figure 7B:
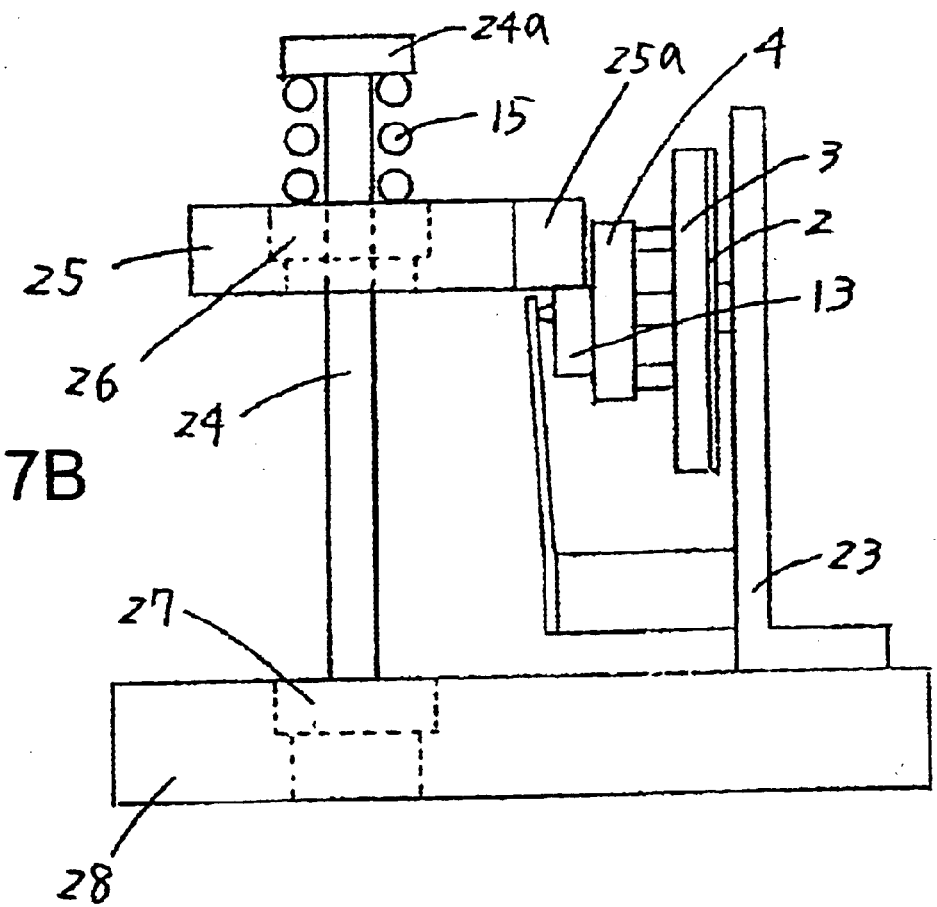

A second embodiment of the present invention will be described. FIG. 7A shows a top plan view of a moving body 25 and FIG. 7B shows a side elevational view of a linear motion mechanism. A support plate 23 of the supersonic motor 1 is fixed to a second support plate 28. Two guide holes are provided in the moving body 25 and are movable in one direction along two shafts 24 fixed at one side end to the second support plate 28. A part 25a of the moving body 25 and the cam 13 are brought into contact with each other in a moving direction of the moving body. The cam 13 rotates as the rotor 4 rotates, thereby operating the moving body 25. At this time, the prepressure spring 15 is interposed between the moving body 25 and the one side ends 24a of the shafts 24 to thereby impart the contact pressure to the part 25a of the moving body and the cam 13.

In this case, for example, if through-holes are formed in the moving body 25 and the second support plate 28 and lenses 26 and 27 are provided, it is possible to realize an attenuator for adjusting an intensity of light, a focusing mechanism for adjusting a focus of light or the like.

There is no limit to how to fix the supersonic motor 1. It is sufficient to apply the force caused by the rotation of the cam 13 in the moving direction of the moving body 25. Also, in this embodiment, the rotor 4 and the cam 13 are formed integrally with each other. However, the rotor 4 and the cam 13 may be formed into discrete members. It is possible to transmit the force of the rotor 4 to the cam 13 by using a gear, a frictional wheel or the like. The rotation of the rotor 4 is decelerated so that the large force may be generated in the cam 13. Also, a rack may be provided in a part 25a of the moving body, and the moving body may be moved by a pinion cooperating with the rotor 4.

Figure 8A:
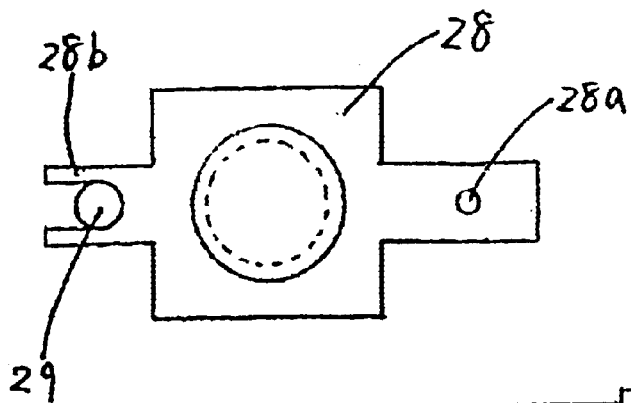
FIGS. 8A–8B show a modification example 1 of the second example of the linear motion mechanism using the supersonic motor according to the present invention.
Figure 8B:
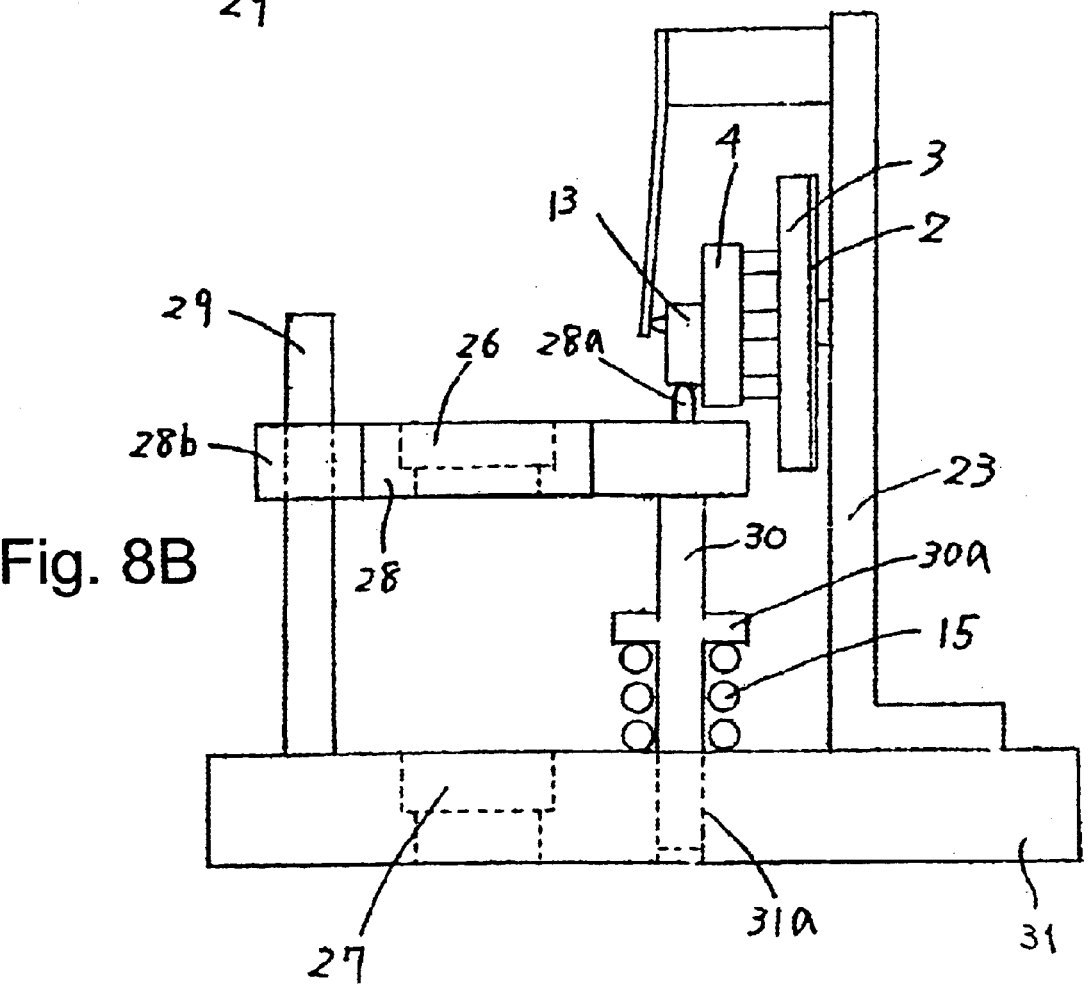

FIGS. 8A–8B show another example related to the second embodiment of the present invention. FIG. 8B is a side elevational view of a linear motion mechanism and FIG. 8A is a top plan view of a moving body 28. A support plate 23 of the ultrasonic wave motor 1 is fixed to a second support plate 31. A guide shaft 30 is provided on the moving body 28 and is movable in a constant direction along a guide hole 31a of the second support plate 31. A shaft 29 having its one end fixed to the second support plate 31 is inserted into a guide portion 28b provided in the moving body 28 to thereby restrict the movement in the vertical direction and the moving direction of the moving body 28. A projection 28a provided in a part of the moving body 28 and the cam 13 are in contact with each other toward the moving direction of the moving body. The cam 13 rotates together as the rotor 4 rotates, thereby operating the moving body 28. At this time, a prepressure spring 15 is interposed between a stepped portion 30a of the guide shaft and the second support plate 31 to apply a contact pressure to the cam 13 and the projection 28a provided in a part of the moving body.

In this case, for example, if through-holes are formed in the moving body 28 and the second support plate 31 and lenses 26 and 27 are provided, it is possible to realize an attenuator for adjusting an intensity of light, a focusing mechanism for adjusting a focus of light or the like.

There is no limit to how to fix the supersonic motor 1. It is sufficient to apply the force caused by the rotation of the cam 13 in the moving direction of the moving body 28. Also, in this embodiment, the rotor 4 and the cam 13 are formed integrally with each other. However, the rotor 4 and the cam 13 may be formed into discrete members. It is possible to transmit the force of the rotor 4 to the cam 13 by using a gear, a frictional wheel or the like. The rotation of the rotor 4 is decelerated so that the large force may be generated in the cam 13. Also, a rack may be provided in a part 28b of the moving body and the moving body may be moved by a means of pinion cooperating with the rotor 4.

Figure 9A:
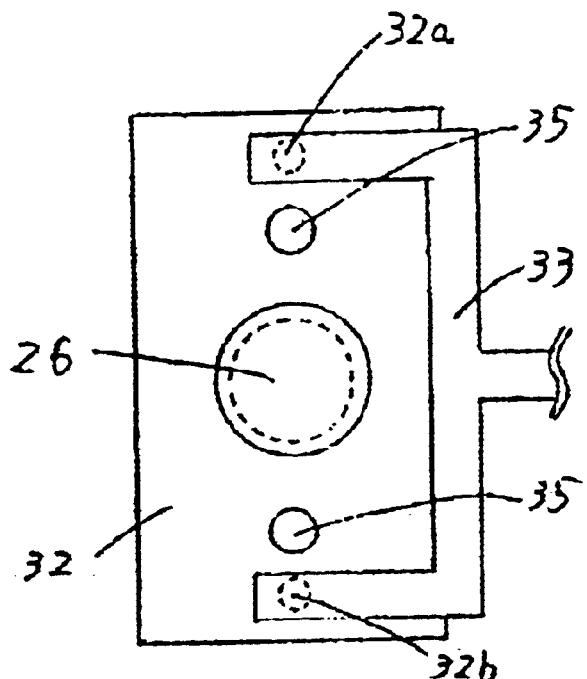
FIGS. 9A–9B show a modification example 2 of the second example of the linear motion mechanism using the supersonic motor according to the present invention.
Figure 9B:
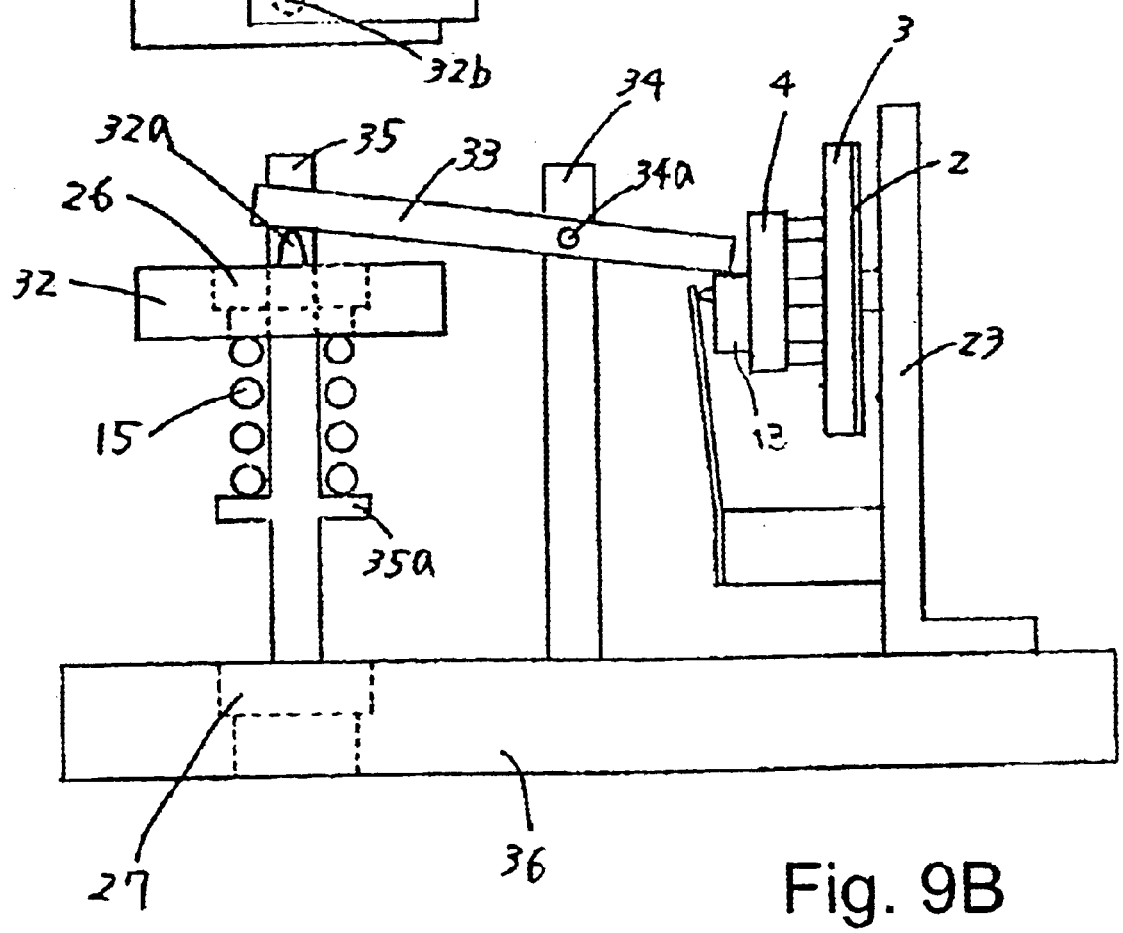

FIGS. 9A–9B show another example related to the second embodiment of the present invention. FIG. 9B is a side elevational view of a linear motion mechanism and FIG. 9A is a top plan view of a moving body 32. A support plate 23 of the ultrasonic wave motor 1 is fixed to a second support plate 36. Two guide holes are provided in the moving body 32, and is movable in a constant direction along the two shafts 35 having their one ends fixed to the second support plate 36. A power transmission member 33 is supported so as to be rotatable by a guide pin 34a of a fixing member 34. Separate one ends of the power transmission member 33 is contacted in the moving direction of the moving body 32 with the cam 13 and the projections 32a and 32b provided in a part of the moving body 32. The cam 13 rotates together as the rotor 4 rotates, thereby operating the moving body 32 through the power transmission member 33. At this time, a prepressure spring 15 is interposed between a stepped portion 35a of the shaft 35 and the moving body 32 to apply a contact pressure to the cam 13, the power transmission member 33 and the projection 32a provided in a part of the moving body.

In FIG. 9, the lens 26 is mounted on the moving body 32. Since the light passes through the lens, it is impossible to arrange the supersonic motor 1 including the cam 13 above the lens. However, in the case where there is no lens, it is preferable to apply the force of the cam 13 directly to a point located at the center of the lens, i.e., the center of the line connecting the two shafts 35, and hence the gravitational center of the moving body 32. For this structure, it is sufficient to provide the projection at the gravitational center of the moving body so as to contact directly with the cam 13 as shown in, for example, FIG. 8.

In this case, for example, if through-holes are formed in the moving body 32 and the second support plate 36 and lenses 26 and 27 are provided, it is possible to realize an attenuator for adjusting an intensity of light, a focusing mechanism for adjusting a focus of light or the like.

There is no limit to how to fix the supersonic motor 1. It is sufficient to apply the force caused by the rotation of the cam 13 in the moving direction of the moving body 32. Also, in this embodiment, the rotor 4 and the cam 13 are formed integrally with each other. However, the rotor 4 and the cam 13 may be formed into discrete members. It is possible to transmit the force of the rotor 4 to the cam 13 by using a gear, a frictional wheel or the like. The rotation of the rotor 4 is decelerated so that the large force may be generated in the cam 13.

The linear motion mechanism using the supersonic motor is applied to electronic equipment whereby it is possible to realize the low voltage ability, low power consumption, miniaturization and cost saving feature of the electronic equipment. Since the supersonic motor is utilized, of course, there is no magnetic effect and no harmful magnetic noise is generated.

Third Embodiment

Figure 10:
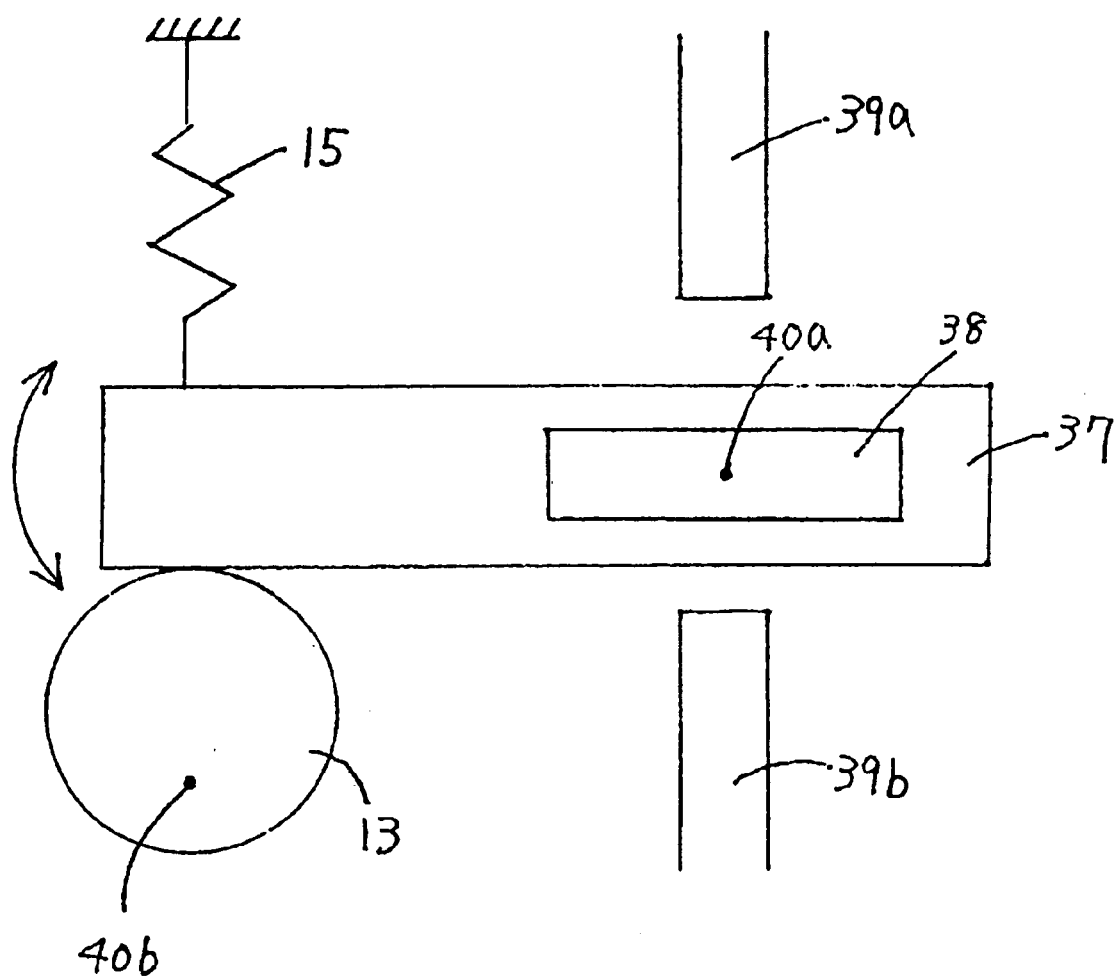
FIG. 10 shows an example of a swing motion mechanism using the supersonic motor according to the present invention.

A third embodiment of the present invention will now be described. FIG. 10 is a top plan view of a pivotal or swing motion mechanism using a supersonic motor 1 and its application.

The moving body 37 is supported rotatably in a direction indicated by the arrow 39 about a point 40a. There is no limit as to how the moving body may be supported. A bearing and a center shaft having the center located at the point 40a can be used on the bottom surface of the moving body 37, for example.

A cam 13 formed integrally with the rotor 4 that receives the drive force of the vibrating body 3 (not shown) and rotates is in contact with one of the side surfaces of the moving member 37 to the rotational direction. When the cam 13 is rotated, the moving body 37 takes a swing motion such that it again returns back to the same position in accordance with the profile. The moving body 37 and the cam 13 are always in contact with each other by receiving a prepressure of a prepressure spring 15. The rotational motion of the rotor 4 is converted into the swing motion of the moving body 37 through the cam 13 to thereby obtain a fine angular shift of the moving body 37. It is therefore possible to further enhance the positioning resolving power with high precision owned by the supersonic motor 1.

For instance, if a filter 38 made of dielectric multi-layered film is provided on a top surface of the moving body 37, and an optical fiber 39a is provided at a confronting position with the filter 38, the transmission center wavelength of a ray of light introduced from the optical fiber 39a and passing through the filter 38 changes in accordance with an angle of the filter 38 and is introduced into the optical fiber 39b. Accordingly, it is possible to realize an optical filter that is thus superior in variable resolving power.

Fourth Embodiment

Figure 12:
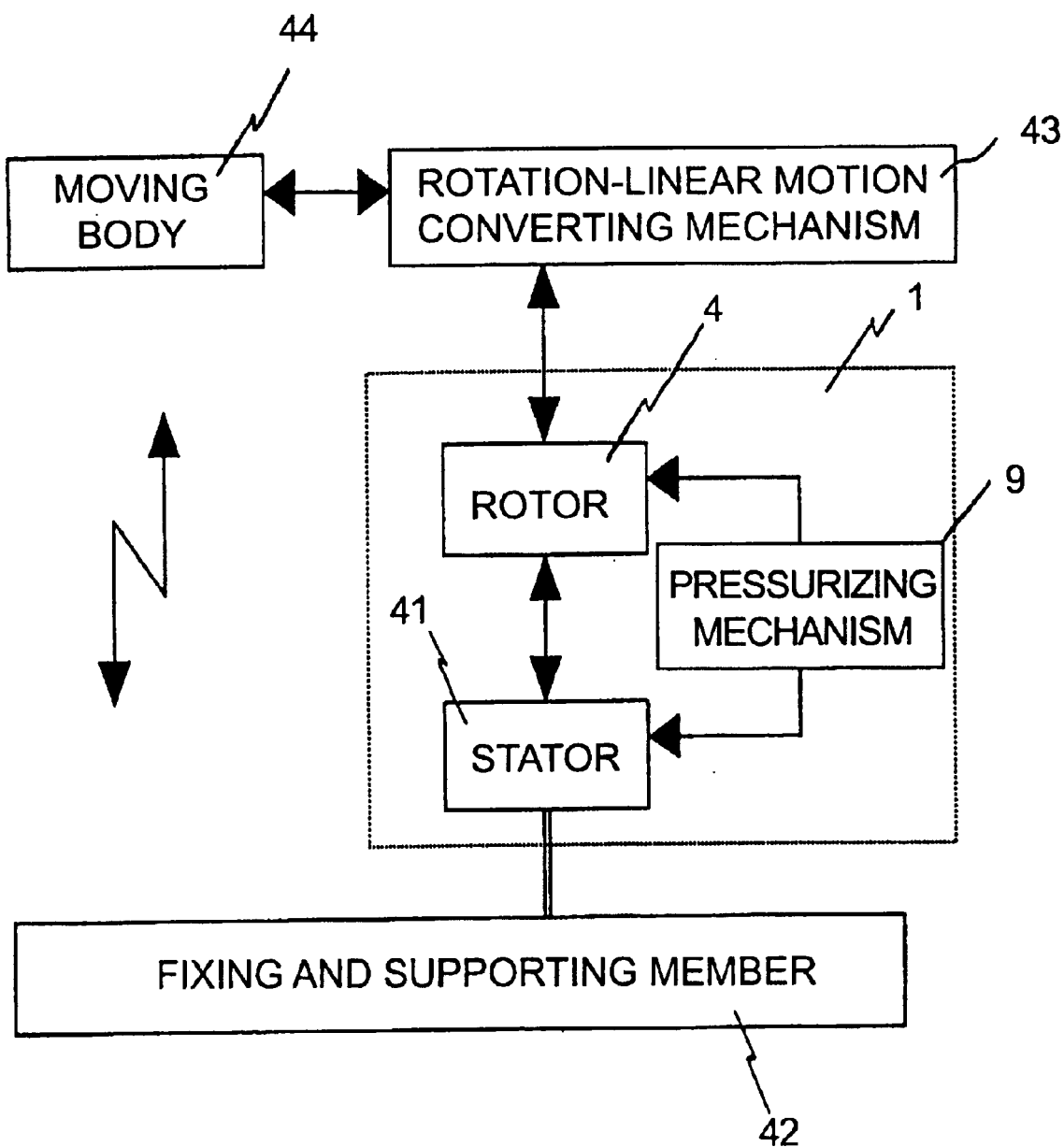
FIG. 12 shows a block diagram of the third example of the linear motion mechanism using the supersonic motor according to the present invention.

FIG. 12 is a block diagram of the third example of the linear motion mechanism using the supersonic motor according to the present invention. The supersonic motor 1 is composed of a stator 41 generating elastic vibration to the vibrating body having the piezoelectric element, the rotor 4 converted into the rotational motion through the frictional force by the elastic vibration of the stator and the first pressurizing mechanism 9 for imparting a suitable pressure to the rotor and the stator. In this case, the stator 41 is fixed to the fixing and supporting member 42 and the rotational motion of the rotor 4 is converted into the linear motion of the moving body 44 by the rotation-linear motion converting mechanism 43.

Figure 11:
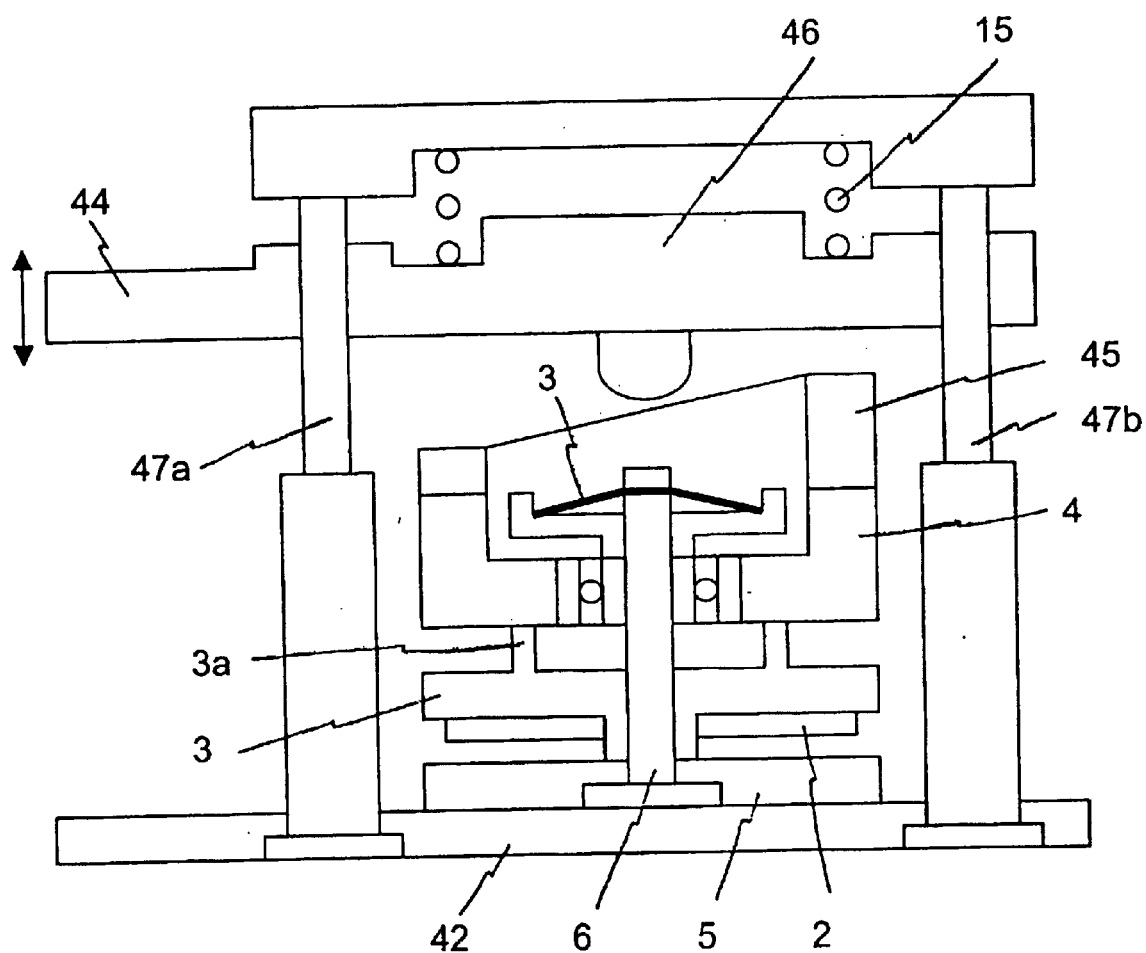
FIG. 11 shows a third example of a linear motion mechanism using a supersonic motor according to the present invention.

FIG. 11 is a first example of a linear motion mechanism using a supersonic motor according to the present invention.

A rotary body 45 has a slant portion that has at least one different thickness in the circumferential direction of the rotor 4 and is fixed so as to be rotated together with the rotor 4. A linearly moving body portion 46 having a projecting portion at least a part of which is in contact with the slant portion of the rotary body 45 is guided by guide members 47a and 47b in accordance with the rotational motion of the rotor so that the linearly moving body portion 46 is moved linearly in the thickness direction of the rotor. The linearly moving body portion 46 has, at a part thereof, a moving body 44 that is to be driven. Here, the pressurizing spring 15 that is a second pressurizing mechanism is provided so that the linearly moving body portion 46 of the moving body 44 is pressed and contacted at a suitable pressure to the rotary body portion 45 so that the minute rattle amount may be compensated for to thereby realize a linear motion mechanism with a supersonic motor with high precision. Incidentally, since the pressurizing pressure in the pressurizing spring 15 that is the second pressurizing mechanism is set to be smaller than the pressurizing force of a pressurizing spring that is the first pressurizing mechanism a so that the drive force of the supersonic motor is not affected by an adverse effect due to an external turbulence such as a load of a moving member 100, body 44, it is possible to realize a linear motion mechanism with a supersonic motor that is stable even in small size and thin shape to obtain the drive force.

Figure 13:
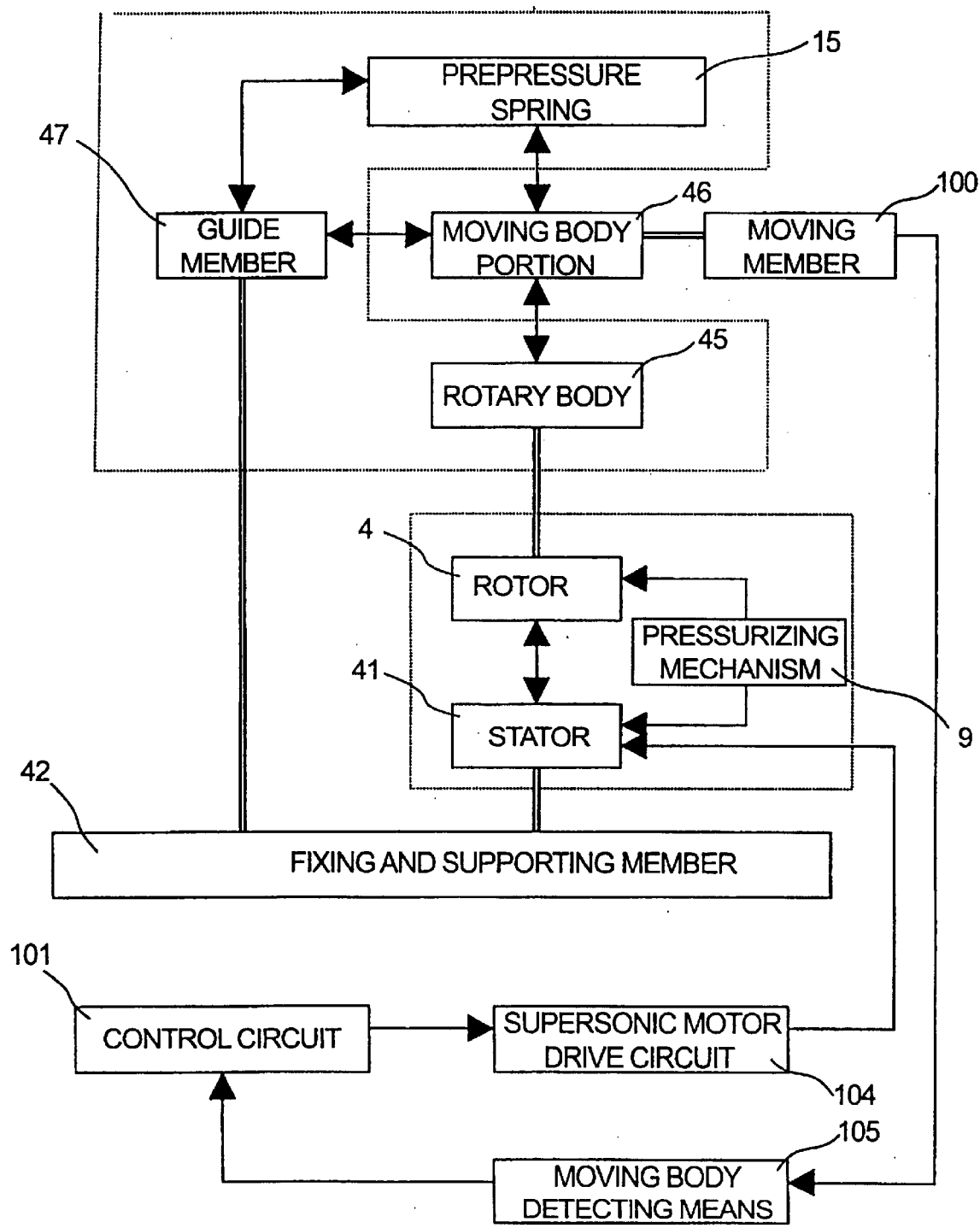
FIG. 13 shows a modification example 1 of a third example of a linear motion mechanism using a supersonic motor according to the present invention.

FIG. 13 is a block diagram showing a modification example 1 of the third example of the linear motion mechanism using the supersonic motor. The basic structure thereof is not different from that shown in FIG. 11. However, it is noted that the amount of movement of the moving member 100, corresponding to the moving body 4 in FIG. 11, is detected by means of a moving body detecting means 105 and a signal thereof is fed to the control circuit 101 and the position is drivingly compensated for with the supersonic motor drive circuit 104.

The moving body detecting means 105 includes intensity, fringe, wavelength as amount of change of light, and a change amount of magnetic field.

Figure 14:
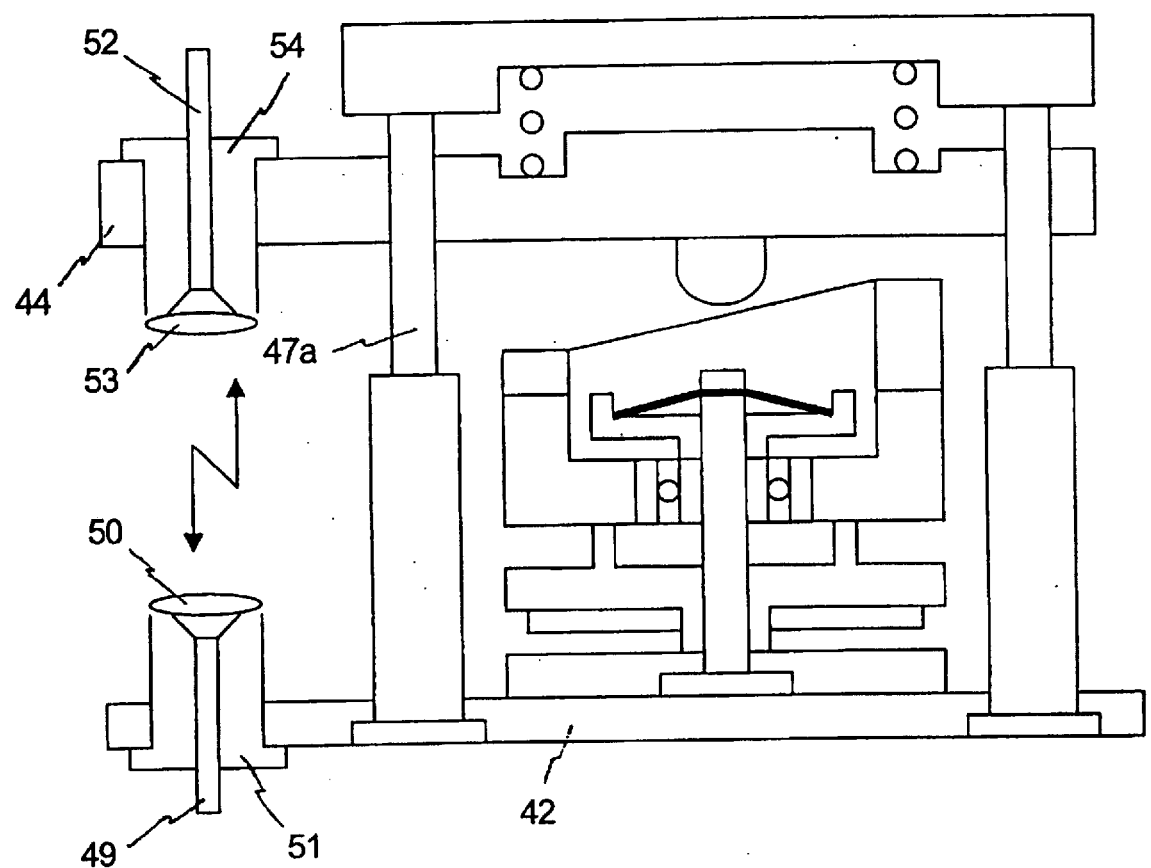
FIG. 14 shows a modification example 2 of the third example of the linear motion mechanism using the supersonic motor according to the present invention.

FIG. 14 is a diagram showing a modification example 2 of the third example of the linear motion mechanism using the supersonic motor. The basic structure thereof is not different from that shown in FIG. 11. However, a connector 51 in which a fiber 49 and a lens 50 are arranged centrally is provided on the fixing and supporting member 42 and in the same manner a connector 54 in which a fiber 52 and a lens 53 is arranged centrally is provided on the moving body 44 and the moving body 44 is linearly moved by the rotation of the supersonic motor so that an optical intensity is variable when the intensity of light emitted from the fiber 49 is received in the fiber 52. With such an arrangement, for instance, it is possible to realize an attenuator that is an optical information communication module which is free from the effect of magnetic noise and strong against an external turbulence such as vibrations, and which is small in size and has low power consumption.

Figure 15:
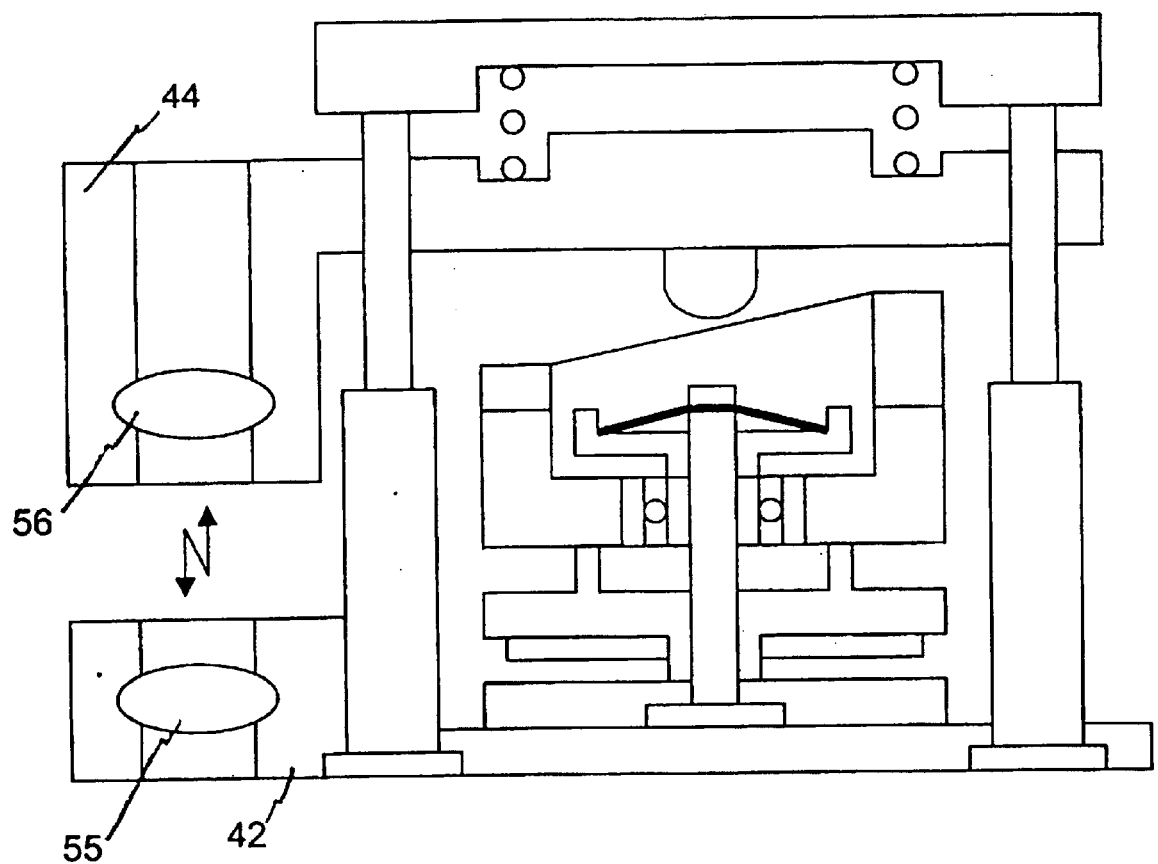
FIG. 15 shows a modification example 3 of the third example of the linear motion mechanism using the supersonic motor according to the present invention.

FIG. 15 is a diagram showing a modification example 3 of the third example of the linear motion mechanism using the supersonic motor. The basic structure thereof is not different from that shown in FIG. 11. However, a lens 55 is mounted on the fixing and supporting member 42 and in the same manner a lens 56 is mounted on the movable body 44. The moving body 44 is moved linearly by the rotation of the supersonic motor to thereby change an optical distance. With such an arrangement, for example, it is possible to realize a focus setting mechanism, an auto-focus mechanism, an iris mechanism for a camera, a video camera, an optical pickup or the like that are free from the adverse affect of magnetic noise and are strong against an external turbulence such as vibrations, and which is small in size and has low power consumption.

Figure 16:
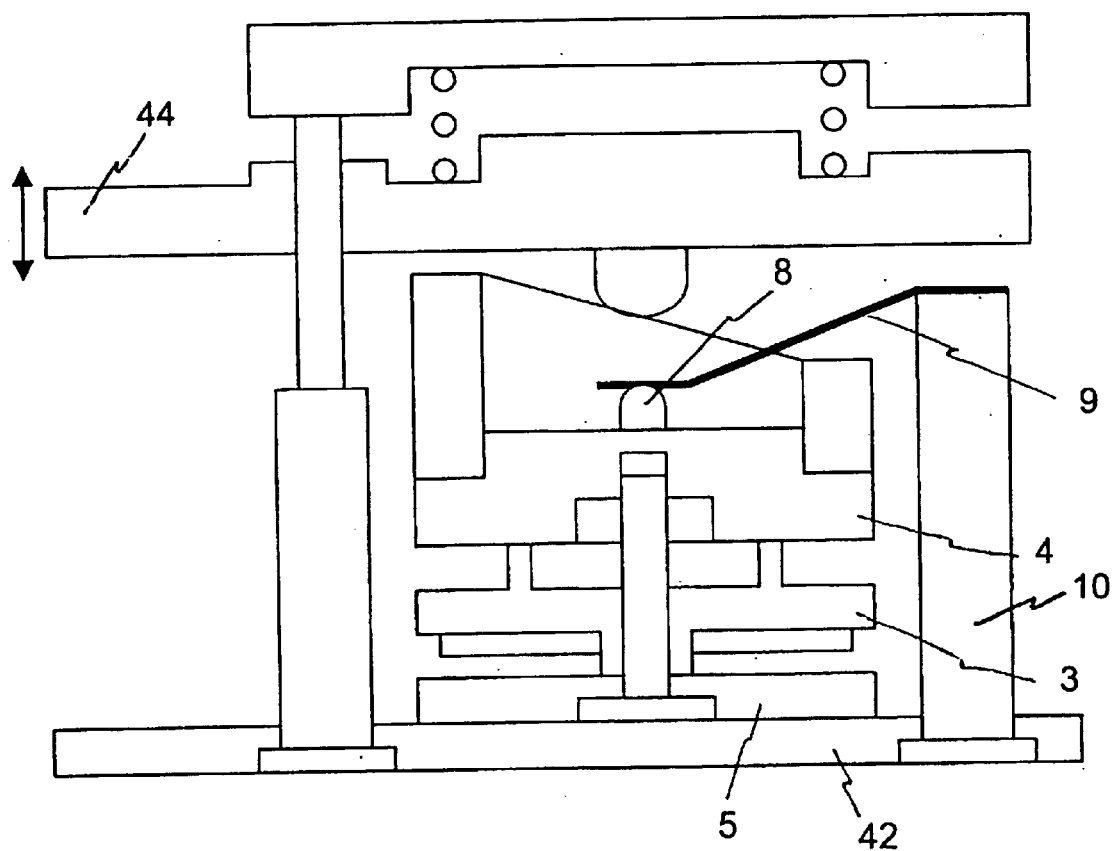
FIG. 16 shows a modification example 4 of the third example of the linear motion mechanism using the supersonic motor according to the present invention.

FIG. 16 is a block diagram showing a modification example 4 of the first example of the linear motion mechanism using the supersonic motor. The basic structure thereof is not different from that shown in FIG. 11. However, the structure is different from that in the following point. Whereas the bearing is used for bearing the shaft in the foregoing embodiment, a pivot portion 8 is provided at a central portion of the rotor 4 and the rotor 4 is pressed and contacted against the vibrating body 3 by the pressurizing spring 9 that is the first pressurizing mechanism provided in the spring seat 10 that is formed integrally with the fixing and supporting member 42 or the support plate 5 in this embodiment. Namely, since the pressurizing mechanism may be realized by the simple structure when the system is to be miniaturized, it is possible to realize a small size linear motion mechanism.

Figure 17:
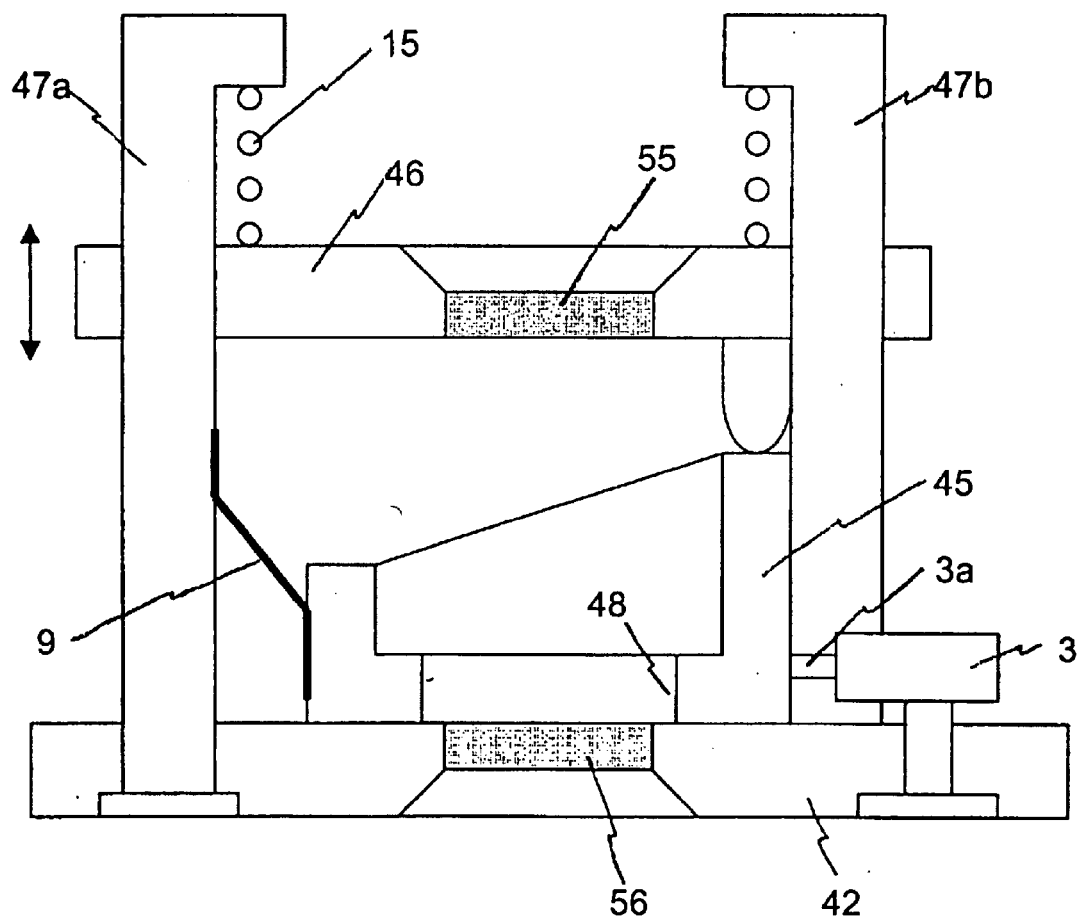
FIG. 17 shows a modification example 5 of the third example of the linear motion mechanism using the supersonic motor according to the present invention.

FIG. 17 is a block diagram showing a modification example 5 of the third example of the linear motion mechanism using the supersonic motor. In this embodiment, a lens 56 is provided directly to the fixing and supporting member 42 and formed integrally with the rotor, a hole portion 48 through which the light from the lens 56 may pass is provided in the central portion, and a lens 55 is embedded directly in the linearly moving body portion 46 to thereby make it possible to realize further miniaturization of the linear motion apparatus that has been described in the foregoing embodiments. Incidentally, in this case, the drive of the rotating body portion 45 is used to transmit through the projections 3a a fine vibration generated in the vibrating body 3 arranged on the side wall. In this case, the pressurizing spring 9 that is the first pressurizing mechanism is arranged to the vibrating body 3 from the side wall of the rotating body portion 45. Incidentally, although the direct drive from the side wall of the vibrating body 3 is shown in this embodiment, it is possible to form a gear around the outer circumferential portion of the rotating body portion 45 to perform the drive by the motor through the reduction gear train.

In the linear motion mechanism with the supersonic motor according to this embodiment, the rotating body portion 45 is in contact with the linearly moving body portion 46 at one point. However, if the rotating body portion 45 has a projecting portion that enables the rotating body portion to come in contact with the linearly moving body portion 46 at three points, the point of application of force of the linearly moving body portion 46 that operates together with the moving body 44 acts stably and uniformly on the rotating body portion. Therefore the portion operates smoothly thereby making the invention strong against the external turbulence such as vibration.

Fifth Embodiment

Figure 18:
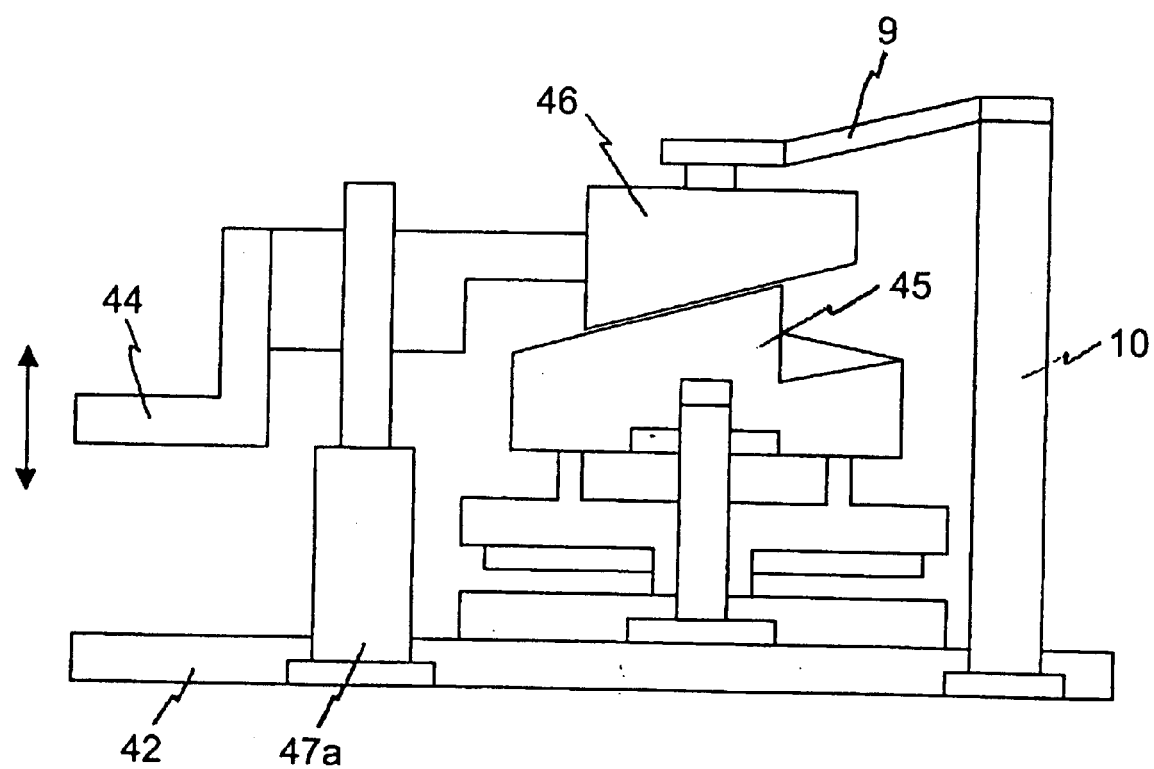
FIG. 18 shows a fourth example of a linear motion mechanism using a supersonic motor according to the present invention.
Figure 19:
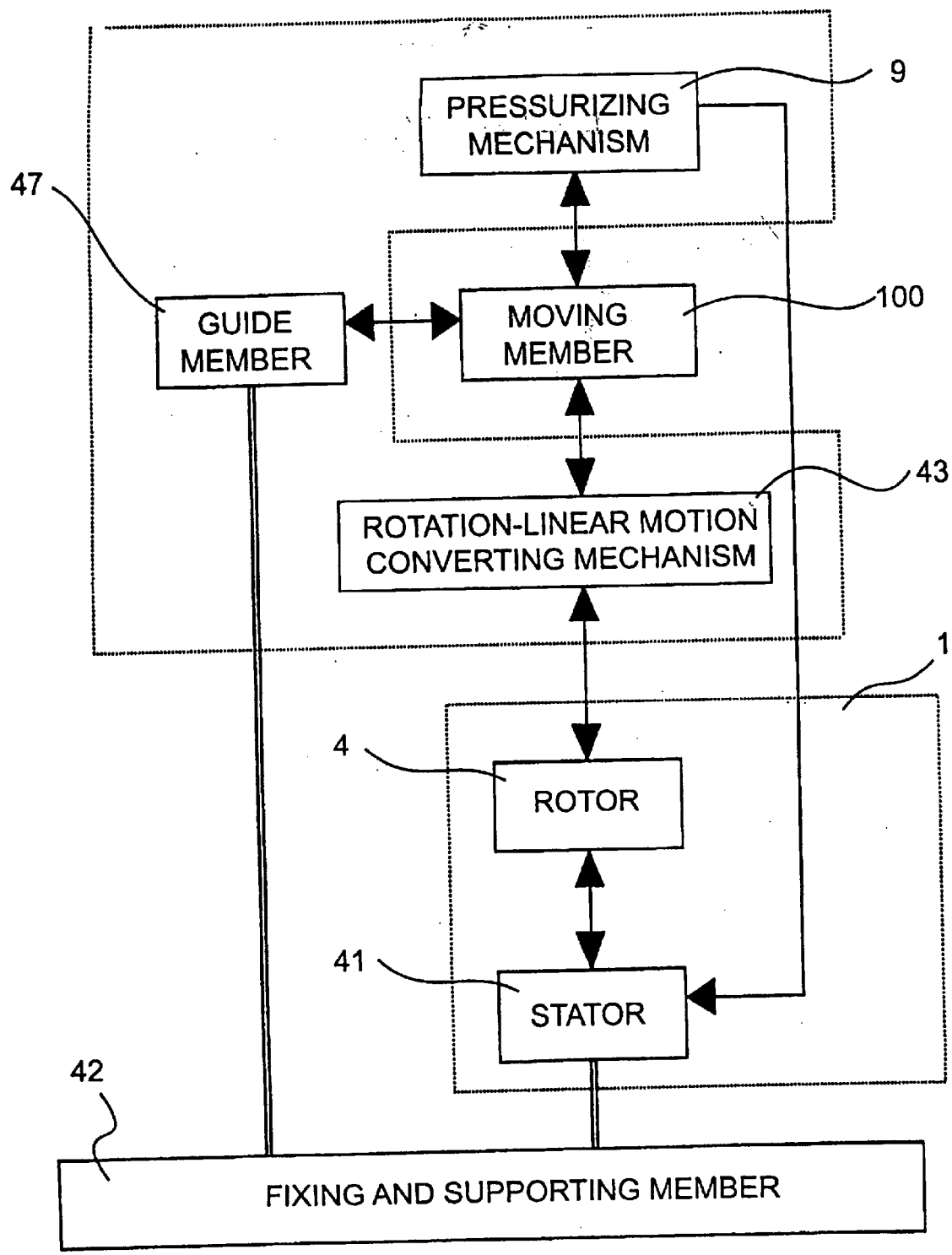
FIG. 19 shows a block diagram of the fourth example of the linear motion mechanism using the supersonic motor according to the present invention.

A fifth embodiment of the present invention will now be described. FIG. 18 shows a fourth example of a linear motion mechanism using a supersonic motor according to the present invention. FIG. 19 is a block diagram showing the fourth example of the linear motion mechanism using the supersonic motor according to the present invention. The basic structure is the same as that of the foregoing embodiments. The difference is that the first pressurizing mechanism for applying a suitable pressurizing force to the stator and the rotor and the second pressurizing mechanism disposed so that the linearly moving body portion is pressurized and contacted at a suitable pressure against the rotating body portion are used in common. Thus, it is possible to realize the linear motion mechanism with the supersonic motor in even smaller size and thinner shape. Namely, the rotating body portion 48 formed integrally with the rotor is pressurized and contacted by the pressurizing spring 9 fixed to the pressurizing spring seat 10.

Figure 20:
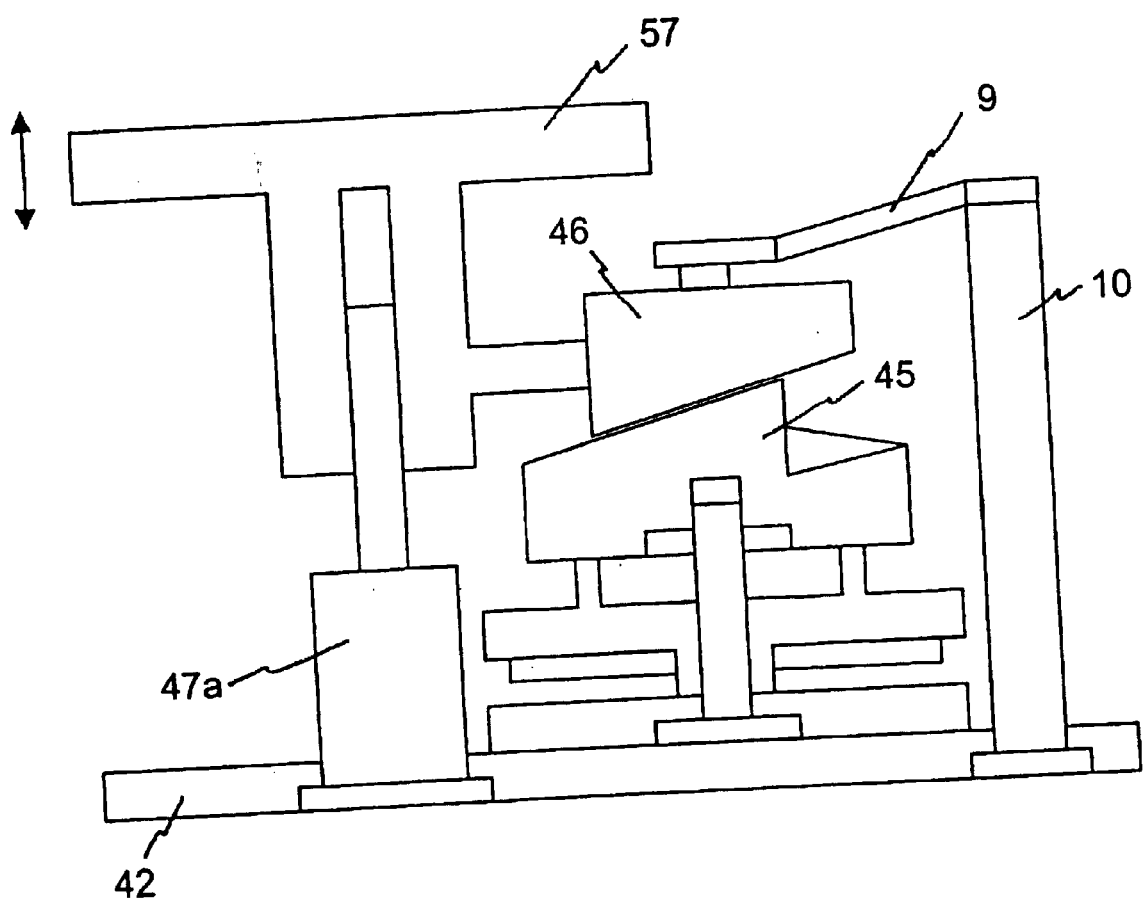
FIG. 20 shows a modification example 1 of the fourth example of the linear motion mechanism using the supersonic motor according to the present invention.

FIG. 20 shows a modification example 1 of the second example of the linear motion mechanism using the supersonic motor according to the present invention. The basic structure is the same as that shown in FIG. 18. However, a stage 57 is provided in the moving body portion to drive the loaded members to thereby make it possible to realize electronic equipment that is strong against the external turbulence such as vibration and free from the magnetic noise in a compact shape and in low power consumption. In particular, it is possible to realize a finely movable linear motion stage in a super compact shape.

As described above, according to the present invention, the moving body is moved in a linear manner by the rotary type supersonic motor and the output transmission means such as a cam or a pinion that rotates in cooperation with the rotor of the supersonic motor, and also, the pressurizing mechanism for imparting the contact pressure between the moving body and the output transmission member to realize the linear motion mechanism with the supersonic motor, to thereby make it possible to perform rough and fine feed with high precision without any backlash and to form the linear motion mechanism that is hardly affected by the effect such as external vibration and is high in rigidity.

Also, since the supersonic motor that is small in size and high in output is used, it is possible to construct the linear motion mechanism that does not affect the others and does not receive the magnetic effect, with the overall compact and thin shape of the mechanism. Also, it is characterized in that the power is not consumed during the mechanism is not in operation.

Accordingly, it is possible to realize a linear motion mechanism with a supersonic motor that is small in size, low in power consumption, and is capable of high precision positioning, and electronic equipment using the same.

What is claimed is:

1. A linear motion mechanism comprising:
   a supersonic motor having a rotor which is rotationally driven by vibration of a vibrating body having a piezoelectric element;
   a transmission member disposed on the rotor for rotation therewith, the transmission member having a tapered portion varying in thickness along a direction generally perpendicular to a longitudinal axis of the rotor;
   a moving body having an end portion in contact with the transmission member for undergoing linear movement in a direction generally parallel to the longitudinal axis of the rotor in accordance with rotation of the transmission member, the moving body having a tapered portion contacting the tapered portion of the transmission member, the tapered portion of the moving body having a thickness which varies along a direction generally perpendicular to the longitudinal axis of the rotor; and
   a pressurizing mechanism pressing the moving body into pressure contact with the transmission member.

2. A linear motion mechanism comprising:
   a supersonic motor having a rotor which is rotationally driven by vibration of a vibrating body having a piezoelectric element;
   a first transmission member connected to the rotor for rotation therewith;
   a second transmission member having a first end portion contacting the first transmission member and a second end portion, the second transmission member being mounted for undergoing pivotal movement about a pivoting point disposed between the first and second end portion during rotation of the first transmission member;
   a moving contacting the second end portion of the second transmission member to undergo linear movement in a direction crosswise to a longitudinal axis of the rotor in accordance with rotation of the first transmission member and pivotal movement of the second transmission member; and
   a pressurizing mechanism pressing the moving body into pressure contact with the second end portion of the second transmission member.

3. A linear motion mechanism according to claim 2; wherein the moving body has a projecting portion for contacting the second end portion of the second transmission member.

4. A linear motion mechanism according to claim 2; further comprising a detecting device for detecting an amount of linear movement of the moving body; and a control circuit for controlling a position of the moving body in accordance with the amount of linear movement detected by the detecting device.

5. An electronic device comprising: a linear motion mechanism according to claim 2; and a load member disposed on the moving body of the linear motion mechanism.

6. A linear motion mechanism comprising:
   a supersonic motor having a rotor which is rotationally driven by vibration of a vibrating body having a piezoelectric element;
   a rotational body connected to the rotor for rotation therewith, the rotational body having a tapered portion varying in thickness along a direction generally, perpendicular to a longitudinal axis of the rotor;
   a moving body having a projecting portion contacting the tapered portion of the rotational body to undergo linear movement in a direction generally parallel to the longitudinal axis of the rotor in accordance with rotation of the rotational body;
   a pressurizing mechanism pressing the projecting portion of the moving body into pressure contact with the tapered portion of the rotational body;
   a support member for supporting the supersonic motor; and
   a guide a mounted on the support member for guiding the linear movement of the moving body.

7. A linear motion mechanism comprising:

a supersonic motor having a rotor which is rotationally driven by vibration of a vibrating body having a piezoelectric element;

a support member for supporting the supersonic motor;

a first pressing member pressing the rotor into pressure contact with the vibrating body;

a rotational body connected to the rotor for rotation therewith, the rotational body having a tapered portion varying in thickness along a direction generally perpendicular to a longitudinal axis of the rotor;

a moving body having a projecting portion contacting the tapered portion of the rotational body to undergo linear movement toward and away from the support member in a direction generally parallel to the longitudinal axis of the rotor in accordance with rotation of the rotational body;

a moving member connected to the moving body for undergoing linear movement therewith;

a guide member mounted on the support member for guiding the linear movement of the moving body and the moving member; and a second pressing member pressing the projecting portion of the moving body into pressure contact with the tapered portion of the rotational body.

* * * * *